United States Patent [19]
Fukushima et al.

[11] Patent Number: 5,642,338
[45] Date of Patent: Jun. 24, 1997

[54] INFORMATION RECORDING MEDIUM AND APPARATUS AND METHOD FOR RECORDING AND REPRODUCING INFORMATION

[75] Inventors: Yoshihisa Fukushima; Masahiro Inagaki, both of Osaka; Yasushi Azumatani, Takatsuki; Hiroshi Hamasaka, Hirakata, all of Japan

[73] Assignee: Matsushita Electric Industrial Co., Ltd., Osaka, Japan

[21] Appl. No.: 692,812

[22] Filed: Jul. 30, 1996

Related U.S. Application Data

[62] Division of Ser. No. 319,680, Oct. 7, 1994.

[30] Foreign Application Priority Data

Oct. 8, 1993 [JP] Japan .................. 5-252854

[51] Int. Cl.$^6$ .................................................. G11B 7/00
[52] U.S. Cl. .................. 369/59; 369/60; 369/48; 360/48; 360/44; 386/1
[58] Field of Search ................ 369/59, 58, 47, 369/48, 49, 50, 54, 60, 32; 360/48, 53, 39, 40, 44, 49, 29, 19.1, 20, 32; 358/335, 342, 339; 348/423, 474

[56] References Cited

U.S. PATENT DOCUMENTS

| | | |
|---|---|---|
| 5,111,444 | 5/1992 | Fukushima et al. . |
| 5,138,599 | 8/1992 | Fukushima et al. . |
| 5,140,437 | 8/1992 | Yonemitsu et al. . |
| 5,270,877 | 12/1993 | Fukushima et al. . |
| 5,455,684 | 10/1995 | Fujinami et al. . |
| 5,479,264 | 12/1995 | Ueda et al. .................. 358/335 |
| 5,481,543 | 1/1996 | Veltman .................. 348/423 X |
| 5,568,274 | 10/1996 | Fujinami et al. .................. 360/32 X |

FOREIGN PATENT DOCUMENTS

2-72780  3/1990  Japan .
5-20369  1/1993  Japan .

*Primary Examiner*—Muhammad N. Edun
*Attorney, Agent, or Firm*—Ratner & Prestia

[57] ABSTRACT

The data recording/reproducing apparatus of the present invention efficiently performs a trickplay mode operation such as fast forward reproducing and rewind reproducing and a postrecording operation by using a data recording medium storing a variable-bitrate-compressed video data. Each AV file in the video data includes chapter data and first and second pointer data. Each GOP data in the chapter data includes one independent picture data and a plurality of dependent picture data. The first pointer data includes the location data of the independent picture data, and the second pointer data includes the location data of the first pointer data. Further, each GOP data includes an audio data interleaved with the picture data. The first pointer data includes the location data of the corresponding audio data, and the second pointer data includes the location data of the corresponding first pointer data. A hierarchical location data for retrieving the independent picture data and/or the audio data is formed by the first and second pointers.

10 Claims, 13 Drawing Sheets

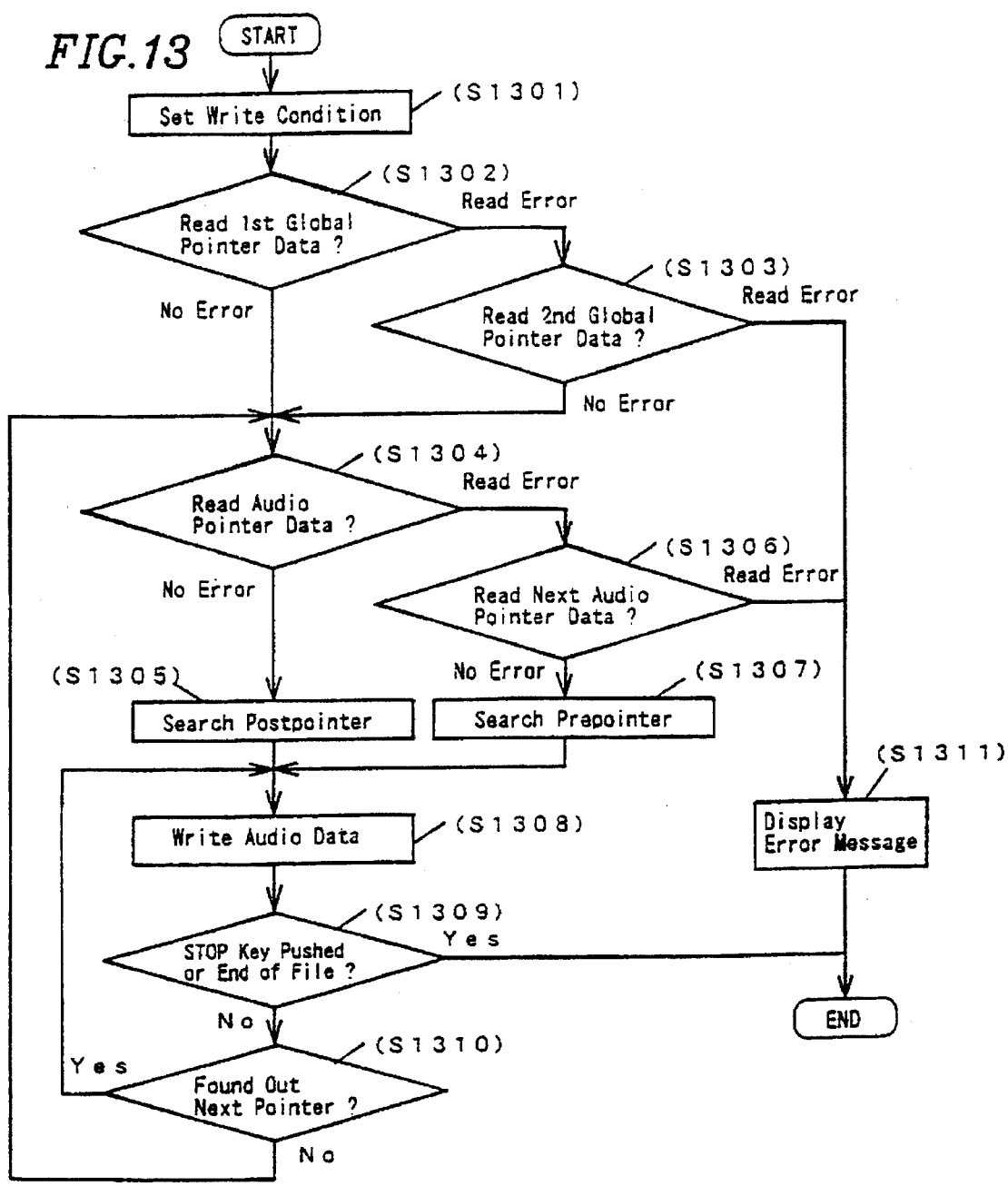

INFORMATION RECORDING MEDIUM AND APPARATUS AND METHOD FOR RECORDING AND REPRODUCING INFORMATION

This application is a division of application Ser. No. 08/319,680, filed Oct. 7, 1994, (status: pending).

BACKGROUND OF THE INVENTION

1. Field of the Invention

The present invention relates to a data recording medium, a data recording/reproducing apparatus and a data recording/reproducing method for recording/reproducing variable-bitrate-compressed video data and audio data synchronized with the video data in each unit of a fixed length. More particularly, the present invention relates to a data recording/reproducing apparatus and a data recording/reproducing method that rapidly performs a recording/reproducing operation of video data, in particular, a trickplay mode operation such as fast forward reproducing and rewind reproducing by using the data recording medium and also performs a postrecording operation to rewrite the audio data alone.

2. Description of the Related Art

Recently, image coding techniques for variable-bitrate-compression of video data in units of a picture have been studied in order to attain fast transfer of mass digital video data and recording of the mass digital video data in a data recording medium having a limited capacity. The MPEG standard, which is one of the image coding techniques, prescribes a compression method for digital video data by combining an I picture that is intra-picture (intra-frame or intra-field) compression coded and a P picture or a B picture that is inter-picture (inter-frame or inter-field) compression encoded. Such a data compression technique realizes the compression of digital video data from, for example, 150 Mbps into 3 Mbps.

In this method, however, the compression ratio of the digital video data depends upon the contents of the video data and the image correlations within the previous and subsequent pictures, and hence, each picture has a largely different capacity. For example, when the average data rate of the compressed video data is 3 Mbps, an image with little motion is compressed into 1 Mbps, while an image with much motion can be compressed into only 10 Mbps. Further, an I picture, a P picture and a B picture forming a series of scenes have respectively different capacities: on the average it is regarded that the I picture has a capacity approximately twice as large as that of the P picture and approximately four times as large as that of the B picture on the average. Therefore, when video data that is variable-bitrate-compressed in units of a picture is recorded on continuous areas on a medium such as an optical disk, where sectors each having a fixed length of, for example, 2 KB (2048 bytes) are previously formed, the location for each picture is largely varied. When such a data recording medium storing the compressed video data is used to perform a trickplay mode operation (such as the fast forward reproducing and the rewind reproducing) using the I picture data alone, it is indispensable to efficiently manage the location data on the I picture data which is located on the recording medium at unequal intervals.

In the MPEG standard, data is compressed in units of a GOP (group of pictures) including one I picture and a plurality of P pictures and B pictures. For example, when an NTSC signal for displaying approximately 30 pictures per 1 second is compressed into units of a GOP including twelve pictures, video data per 1 second includes 2.5 I picture data. Therefore, when a movie title of 135 minutes is compressed under this condition, the title includes as many as 20,250 I picture data. For recording all location data of such a large amount of I picture data using an address of four byte length in one continuous area of a medium, the size of this area is approximately 80 KB. Considering that the buffer capacity for an audio decoder forming a target decoder system described in the MPEG standard is limited within only 4 KB, the 80 KB capacity of a buffer for storing the location data of all I picture data makes it significantly difficult to realize a compact system.

Further, when variable-bitrate-compressed video data and audio data synchronized with the video data are interleaved in units of a sector to be recorded on a recording medium, the audio data is located on the recording medium at unequal intervals even if the audio data is a fixed length data obtained by non-compression coding or constant-bitrate-compression coding. Accordingly, when a rewritable data recording medium where such video data and the audio data are previously recorded is used to rewrite the audio data alone, i.e., to perform a postrecording operation, it is indispensable to efficiently manage the location data of the audio data which is located on the medium at unequal intervals.

For example, when stereo audio data is compressed in accordance with the MPEG standard into the data rate of 224 Kbps, i.e., 28 KB/s, a movie title of 135 minutes includes 226,800 KB of compressed audio data. When the compressed audio data is interleaved with the video data in units of a 2 KB sector to be recorded on a data recording medium, the compressed audio data is dispersedly recorded in 113,400 sectors. For recording all location data of such a large amount of audio data using an address of four byte length in one continuous area of a medium, the size of this area is approximately 450 KB. Further, when the entire audio data in a GOP is recorded in one continuous area, the number of the audio data is identical to that of the I picture data. Therefore, for recording all location data of these audio data in one continuous area, the size of this area is approximately 80 KB. The 450 KB or 80 KB capacity of a buffer is too large as compared with the limitation of buffer capacity for an audio decoder as described above, resulting in restricting the design of compact systems.

SUMMARY OF THE INVENTION

The data recording medium of this invention is a medium having a plurality of units with a fixed length, and is used for recording AV files each including the video data that is compressed in units of a picture on the variable-bitrate condition. Each of the AV files recorded on the data recording medium includes a plurality of chapter data including a plurality of GOP data, a plurality of first pointer data each having a plurality of first pointers, and at least one second pointer data having a plurality of second pointers; each of the GOP data includes one independent picture data that is intra-picture compressed and a plurality of dependent picture data that are inter-picture compressed; each of the first pointers is provided in a one-to-one correspondence to each of the independent picture data, and stores location data of the corresponding independent picture data; each of the second pointers is provided in a one-to-one correspondence to each of the first pointer data and stores location data of the corresponding first pointer data; and a hierarchical location data for retrieving the independent picture data is formed by the first pointers and the second pointers.

In one embodiment of the data recording medium of this invention, each of the chapter data is arranged adjacent to one of the first pointer data which includes the first pointers corresponding to the independent picture data included in that particular chapter data.

In one embodiment of the data recording medium of this invention, the chapter data and the first pointer data are alternately located, and each of the first pointer data includes the first pointers corresponding to the independent picture data included in the chapter data adjacent to that particular first pointer data.

In one embodiment of the data recording medium of this invention, the second pointer data is located at the top and/or end portions of each of the AV files, and the second pointer data includes all of the second pointers corresponding to the first pointer data included in the corresponding AV file, thereby storing the location data on all of the first pointer data included in the corresponding AV file.

In one embodiment of the data recording medium of this invention, each of the GOP data further includes audio data.

In one embodiment of the data recording medium of this invention, the audio data is interleaved with the independent picture data and the dependent picture data of the basis of each unit with the fixed length, and a data type code for discriminating the independent picture data is recorded in each unit with the fixed length.

In one embodiment of the data recording medium of this invention, a padding data is added to the independent picture data, thereby the independent picture data to which the padding data is added completing each unit with the fixed length, and a valid data length for discriminating the padding data is recorded in each unit with the fixed length.

The data reproducing apparatus of this invention uses a data recording medium having a plurality of units with a fixed length, in order to record AV files each including the video data that is compressed in units of a picture on the variable-bitrate condition. Each of the AV files including a plurality of chapter data including a plurality of GOP data, a plurality of first pointer data each having a plurality of first pointers, and a plurality of second pointer data each having a plurality of second pointers; each of the GOP data including one independent picture data that is intra-picture compressed and a plurality of dependent picture data that are inter-picture compressed; each of the first pointers being provided in a one-to-one correspondence to each of the independent picture data and storing location data of the corresponding independent picture data; each of the second pointers being provided in a one-to-one correspondence to each of the first pointer data and storing location data of the corresponding first pointer data. The data reproducing apparatus comprises: a pointer reproducing means for reading out the first and the second pointer data from the data recording medium; a first pointer data storing circuit for temporarily storing the read first pointer data; a second pointer data storing circuit for temporarily storing the read second pointer data; a control circuit for retrieving the location data of the first pointer data based on the second pointer data stored in the second pointer data storing circuit, and retrieving the location data of the independent picture data based on the retrieved location data of the first pointer data and the first pointer data stored in the first pointer data storing circuit; and a picture reproducing means for reproducing a predetermined piece of the independent picture data from the data recording medium based on the retrieved location data of the independent picture data.

In one embodiment of the data reproducing apparatus of this invention, the control circuit comprises a circuit for selecting the location data of the independent picture data to be retrieved in accordance with an externally determined reproducing speed.

In one embodiment, the data reproducing apparatus of this invention uses the data recording medium in which each of the GOP data further includes audio data being interleaved with the independent picture data and the dependent picture data of the basis of each unit with the fixed length, a data type code for discriminating the independent picture data being recorded on the basis of each unit with the fixed length, and the data reproducing apparatus further comprises a data type discriminating circuit for discriminating the data type code recorded in the unit with the fixed length.

In one embodiment, the data reproducing apparatus of this invention uses the data recording medium in which a padding data is added to the independent picture data so that the independent picture data to which the padding data is added completes each unit with the fixed length, a valid data length for discriminating the padding data being recorded on the basis of each unit with the fixed length, and the data reproducing apparatus further comprises a data length detection circuit for detecting the valid data length recorded in the unit with the fixed length.

The data reproducing method of this invention uses a data recording medium having a plurality of units with a fixed length, in order to reproduce AV files each including the video data that is compressed in units of a picture on the variable-bitrate condition, each of the AV files including a plurality of chapter data including a plurality of GOP data, a plurality of first pointer data each having a plurality of first pointers, and at least one second pointer data each having a plurality of second pointers; each of the GOP data including one independent picture data that is intra-picture compressed and a plurality of dependent picture data that are inter-picture compressed; each of the first pointers being provided in a one-to-one correspondence to each of the independent picture data and storing location data of the corresponding independent picture data; each of the second pointers being provided in a one-to-one correspondence to each of the first pointer data and storing location data of the corresponding first pointer data, thereby selectively reproducing the independent picture data. The method comprises the steps of: receiving an externally supplied reproducing condition; reading out the second pointer data from the data recording medium; temporarily storing the read second pointer data; searching the stored second pointer data to retrieve the location data of the first pointer data satisfying the reproducing condition; reading out the first pointer data from the data recording medium based on the retrieved location data of the first pointer data; searching the stored first pointer data to retrieve the location data of the independent picture data satisfying the reproducing condition; and reproducing the independent picture data from the data recording medium based on the retrieved location data of the independent picture data.

In one embodiment of the data reproducing method of this invention, the reproducing condition includes a reproducing speed, and in the step of retrieving the location data of the independent picture data, the location data of the independent picture data to be retrieved is selected in accordance with the reproducing speed, thereby adjusting the interval between the independent picture data that is to be reproduced.

In one embodiment, the data reproducing method uses data recording medium in which each of the GOP data further includes an audio data being interleaved with the independent picture data and the dependent picture data on the basis of each unit with the fixed length, a data type code for discriminating the independent picture data being recorded on the basis of each unit with the fixed length. The step of retrieving the location data of the independent picture data includes the step of discriminating the data type code recorded in the unit with the fixed length, thereby selectively reproducing the independent picture data alone.

In one embodiment, the data reproducing method uses the data recording medium in which a padding data is added to the independent picture data so that the independent picture data to which the padding data is added completes each unit with the fixed length, a valid data length for discriminating the padding data being recorded on the basis of each unit with the fixed length. The step of retrieving the location data of the independent picture data includes the step of detecting the valid data length recorded in the unit with the fixed length, thereby reproducing the independent picture data excluding the padding data.

In one embodiment, the data reproducing method uses the data recording medium in which the second pointer data is located at top and end portions of each of the AV files, the second pointer data including all the second pointers corresponding to the first pointer data included in the corresponding AV file. The step of reading out the second pointer data comprises the steps of: reading the second pointer data recorded at the top portion of the AV file, and when the second pointer data recorded at the top portion of the AV file is unreadable, reading the second pointer data recorded at the end portion of the AV file; and reading the second pointer data at the end portion of the AV file, and when the second pointer data recorded at the end portion of the AV file is unreadable, reading the second pointer data recorded at the top portion of the AV file.

In one embodiment, the data reproducing method uses the data recording medium in which the chapter data and the first pointer data are alternately located, and each of the first pointer data includes the first pointers corresponding to the independent picture data included in the chapter data adjacent to that particular first pointer data, the first pointers include both prepointers storing the location data of the independent picture data included in one of the chapter data located immediately before the corresponding first pointer data and postpointers storing the location data of the independent picture data included in one of the chapter data located immediately after the corresponding first pointer data. The step of reading out the first pointer data comprises the steps of: reading the postpointers included in the nth first pointer data, and when the postpointers included in the nth first pointer data are unreadable, reading the prepointers included in the (n+1)th first pointer data; and reading the prepointers included in the nth first pointer data, and when the prepointers included in the nth first pointer data are unreadable, reading the postpointers included in the (n−1)th first pointer data.

The data recording medium of this invention is a medium having a plurality of units with a fixed length, and is used for recording AV files each including the video data that is compressed in units of a picture on the variable-bitrate condition. Each of the AV files recorded on the data recording medium includes a plurality of chapter data including a plurality of GOP data, a plurality of first pointer data each having a plurality of first pointers, and at least one second pointer data having a plurality of second pointers; each of the GOP data includes at least one picture data and at least one audio data; each of the first pointers is provided in a one-to-one correspondence to each of the audio data and stores location data of the corresponding audio data; each of the second pointers is provided in a one-to-one correspondence to each of the first pointer data and stores location data of the corresponding first pointer data; and a hierarchical location data for retrieving the audio data is formed by the first pointers and the second pointers.

In one embodiment of the data recording medium according to this invention, each of the chapter data is arranged adjacent to one of the first pointer data including the first pointers corresponding to the audio data included in that particular chapter data.

In one embodiment of the data recording medium according to this invention, the chapter data and the first pointer data are alternately located, and each of the first pointer data includes the first pointers corresponding to the audio data included in the chapter data adjacent to that particular first pointer data.

In one embodiment of the data recording medium according to this invention, the second pointer data is located at the top portion and/or end portion of each of the AV files, and the second pointer data includes all of the second pointers corresponding to the first pointer data included in the corresponding AV file, thereby storing the location data on all of the first pointer data included in the corresponding AV file.

The data recording/reproducing apparatus of this invention uses a recording medium for recording and reproducing each unit with a fixed length of a data. The apparatus comprises: a video data generating circuit for generating a compressed picture data by variable-bitrate-compressing an externally input video signal in units of a picture; an audio data generating circuit for generating audio data from externally input audio signal; an interleaving circuit for generating GOP data by interleaving the compressed picture data and the audio data on the basis of each unit with the fixed length, the interleaving being performed in units of a picture group (GOP) including a predetermined number of pictures, and generating a chapter data including a plurality of the GOP data; a means for generating a plurality of first pointers, each first pointer being provided in a one-to-one correspondence to each of the audio data included in the chapter data so as to store a location data of the corresponding audio data, and for generating a first pointer data by allocating the plurality of the first pointers in a predetermined order; a first pointer data storing circuit for temporarily storing the first pointer data; a means for generating a plurality of second pointers, each second pointer being provided in a one-to-one correspondence to each of the first pointer data so as to store a location data of the corresponding first pointer data, and for generating a second pointer data by allocating the plurality of the second pointers in a predetermined order; a second pointer data storing circuit for temporarily storing the second pointers; a means for generating an AV file by alternately allocating the first pointer data and the chapter data and positioning the second pointer data at a predetermined location; and a circuit for recording the AV file on the data recording medium.

In one embodiment, the data recording/reproducing apparatus uses the recording medium in which the second pointer data includes all the second pointers corresponding to the first pointer data included in the corresponding AV file, and the means for generating the AV file allocating the second pointer data at top and/or end portions of each of the AV files.

The data recording/reproducing apparatus of this invention uses an data recording medium having a plurality of units with a fixed length, in order to record AV files each including the video data that is compressed in units of a picture on the variable-bitrate condition, each of the AV files including a plurality of chapter data including a plurality of GOP data, a plurality of first pointer data each having a plurality of first pointers, and at least one second pointer data each having a plurality of second pointers; each of the GOP data including at least one picture data and at least one audio data; each of the first pointers being provided in a one-to-one correspondence to each of the audio data and storing location data of the corresponding audio data; each of the second pointers being provided in a one-to-one correspondence to each of the first pointer data and storing location data of the corresponding first pointer data. The apparatus comprises a postrecording control means including: a means for reading the first and the second pointer data from the data recording medium; a means for detecting a location of the audio data by using the read first and second pointer data; and a circuit for recording input audio data at the detected location.

In one embodiment of the data recording/reproducing apparatus of the present invention, the video data generating circuit and the audio data generating circuit add a data type code for discriminating the kind of data to be recorded to each unit with the fixed length.

In one embodiment of the data recording/reproducing apparatus of the present invention, the video data generating circuit and the audio data generating circuit add a padding data to each of the compressed picture data and the audio data, and add a valid data length for discriminating the padding data to each unit with the fixed length in the compressed picture data and the audio data.

The data recording/reproducing method according to this invention uses a data recording medium for recording/ reproducing each unit with a fixed length of data. The method comprises the steps of: generating a compressed picture data by variable-bitrate-compressing an externally input video signal in units of a picture; generating audio data from externally input audio signal; generating GOP data by interleaving the compressed picture data and the audio data on the basis of each unit with the fixed length, the interleaving being performed in units of a picture group (GOP) including a predetermined number of pictures; generating a chapter data including a plurality of the GOP data; generating a plurality of first pointers, each first pointer being provided in a one-to-one correspondence to each of the audio data included in the chapter data so as to store location data of the corresponding audio data and, generating a first pointer data by allocating the plurality of the first pointers in a predetermined order; temporarily storing the first pointer data; generating a plurality of second pointers, each second pointer being provided in a one-to-one correspondence to each of the first pointer data so as to store location data of the corresponding first pointer data, and generating a second pointer data by allocating the plurality of the second pointers in a predetermined order; temporarily storing the second pointers; generating an AV file by alternately allocating the first pointer data and the chapter data and positioning the second pointer data at a predetermined location; and recording the AV file on the data recording medium.

The data recording/reproducing method according to this invention uses a data recording medium having a plurality of units with a fixed length, in order to record/reproduce AV files each including the video data that is compressed in units of a picture on the variable-bitrate condition, each of the AV files including a plurality of chapter data including a plurality of GOP data, a plurality of first pointer data each having a plurality of first pointers, and at least one second pointer data each having a plurality of second pointers; each of the GOP data including at least one picture data and at least one audio data; each of the first pointers being provided in a one-to-one correspondence to each of the audio data and storing location data of the corresponding audio data; each of the second pointers being provided in a one-to-one correspondence to each of the first pointer data and storing location data on the corresponding first pointer data. The method comprises a postrecording control step including the steps of: reading the first and the second pointer data from the data recording medium; detecting location of the audio data by using the read first and second pointer data; and recording an input audio data at the detected location.

In one embodiment, the data recording/reproducing method uses the recording medium in which the second pointer data includes all the second pointers corresponding to the first pointer data included in the corresponding AV file, in the step of recording the AV file, the second pointer data is allocated at the top and end portions of each AV file. The step of reading the second pointer data included in the postrecording control step further includes the step of reading the second pointer data recorded at the end portion of the AV file when the second pointer data recorded at the top portion of the AV file is unreadable.

In one embodiment, the data recording/reproducing method uses the recording medium in which the audio pointers in the first pointer data include both prepointers storing the location data of the audio data included in one of the chapter data located immediately before the corresponding first pointer data and postpointers storing the location data of the audio data included in one of the chapter data located immediately after the corresponding first pointer data. The step of reading the first pointer data included in the postrecording control step comprises the step of: reading the postpointers included in the nth first pointer data, and when the postpointers included in the nth first pointer data are unreadable, reading the prepointers included in the (n+1)th first pointer data.

Thus, the invention described herein makes possible the advantages of (1) providing a data recording medium having a data structure capable of efficiently managing the location data on a plurality of I picture data located on the recording medium at unequal intervals; (2) providing a data reproducing apparatus and a data reproducing method for performing a trickplay mode operation such as fast forward reproducing and rewind reproducing by using the data recording medium; (3) providing a data recording medium having a data structure capable of efficiently managing the location data of a plurality of audio data recorded on the data recording medium at unequal intervals by interleaving with variable-bitrate-compressed video data in units of a sector; and (4) providing a data reproducing apparatus and a data reproducing method for conducting a postrecording operation by using the data recording medium.

BRIEF DESCRIPTION OF THE DRAWINGS

FIG. 13 is a flowchart for the processing procedures for a postrecording operation by using the data recording/reproducing apparatus of the present invention.

DESCRIPTION OF THE PREFERRED EMBODIMENTS

According to the present invention, a data (information) recording medium storing AV files each including a video data that is variable-bitrate-compressed in units of a picture, is used to conduct fast forward reproducing and rewind reproducing at a high speed. In each of the AV files recorded on the data recording medium of the present invention, an independent picture data is hierarchically managed by a first pointer data (picture pointer data) having the location data of the independent picture data included in each chapter data and a second pointer data (global pointer data) having the location data of the first pointer data. In a data reproducing apparatus and a data reproducing method of the present invention, the location data of the independent picture data is managed by using a hierarchical data structure, and the location data for a large number of the independent picture data located in the AV files at unequal intervals is efficiently retrieved without using a bulk memory, thereby conducting the fast forward reproducing and the rewind reproducing at a high speed.

Further, in the present invention, a data recording medium for storing AV files where audio data and variable-bitrate-compressed video data are interleaved is used to conduct a postrecording operation. In each of the AV files recorded on the data recording medium, the audio data is hierarchically managed by a first pointer data (audio pointer data) having the location data of the audio data included in each chapter data and a second pointer data (global pointer data). In the data recording/reproducing apparatus and recording/reproducing method of the present invention, the location data of the audio data is managed by using such a hierarchical data structure, and the location data for a large number of the audio data located in the AV files at unequal intervals is efficiently managed without using bulk memory, thereby realizing a postrecording operation in which the audio data alone is rewritten.

The data recording medium of the present invention, and the data recording/reproducing apparatus and the data recording/reproducing method using the data recording medium will now be described referring to the accompanying drawings. The data recording/reproducing apparatus of the present invention is capable of a rapid trickplay mode operation such as fast forward reproducing and rewind reproducing of video data as well as ordinary recording/reproducing operations, and can perform a postrecording operation in which audio data alone is rewritten.

(EXAMPLE 1)

Figure 1:
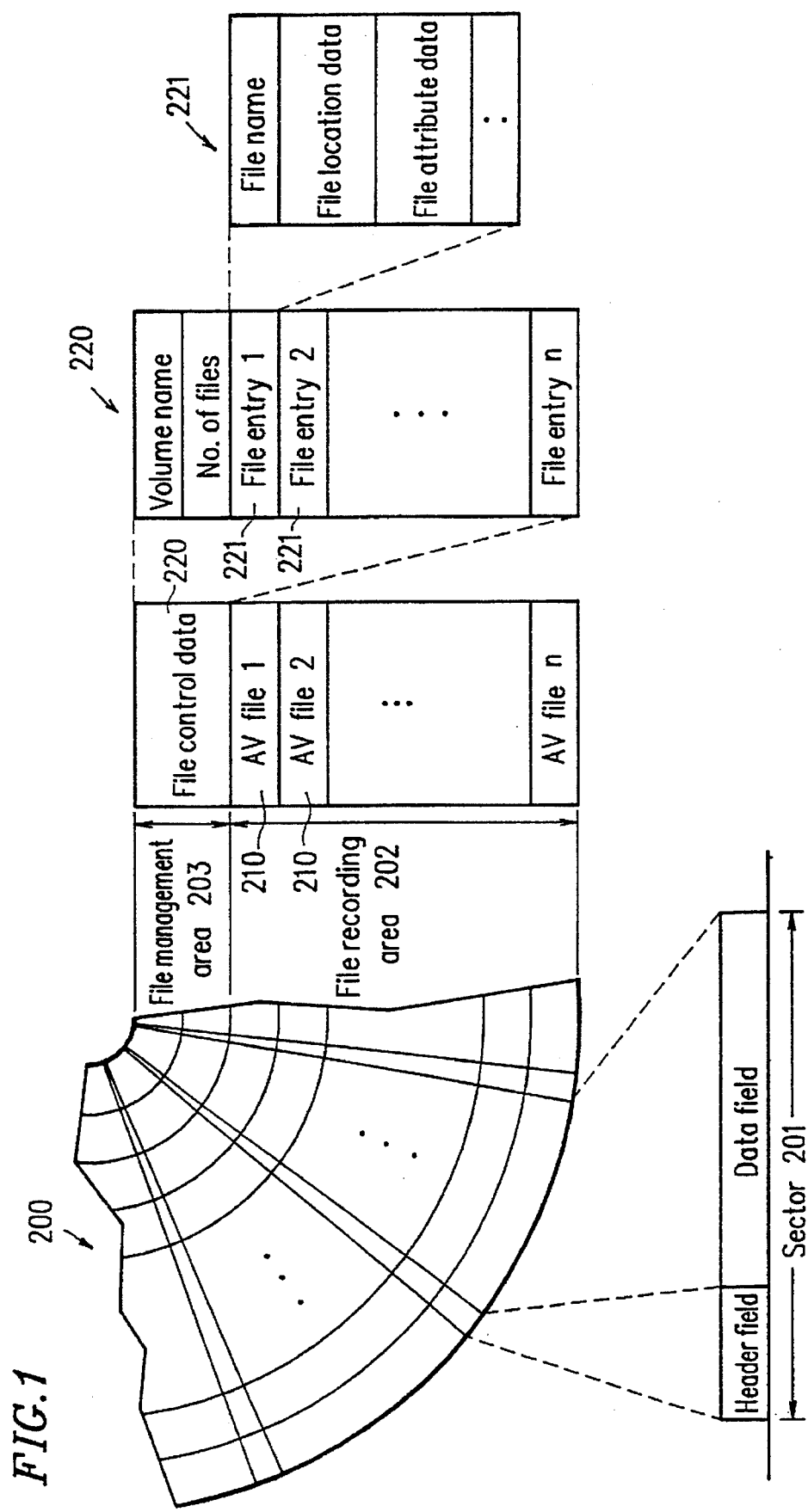
FIG. 1 shows the area structure of a data recording medium according to one example of the present invention.

FIG. 1 shows the area structure of a data recording medium 200 according to Example 1 of the present invention. The data recording medium 200 has a data structure for rapidly conducting a trickplay mode operation. On the disk-shaped data recording medium 200 are formed a large number of concentrical or spiral tracks. Each track is divided into a large number of sectors 201 each including a header field for storing an address data and the like and a data field for storing user data of, for example, 2048 bytes. In a read-only recording medium, both the header field and the data field are pre-formatted during the production process of the medium. In a rewritable recording medium, the header field alone is preliminarily formulated during the production.

In the data recording medium 200, a file recording area 202 is assigned to the outer tracks, and a file management area 203 is assigned to the inner tracks. The file recording area 202 stores a large number of AV files 210 each including a variable-bitrate-compressed video data. The file management area 203 stores file control data 220 for each AV file 210, in which a volume name and the number of the stored AV files are recorded at the leading portion followed by a large number of file entries 221 each corresponding to each of the AV files 210. Each of the file entries 221 includes a file related data such as the file name, the file location and the file size of the corresponding AV file.

Figure 2:
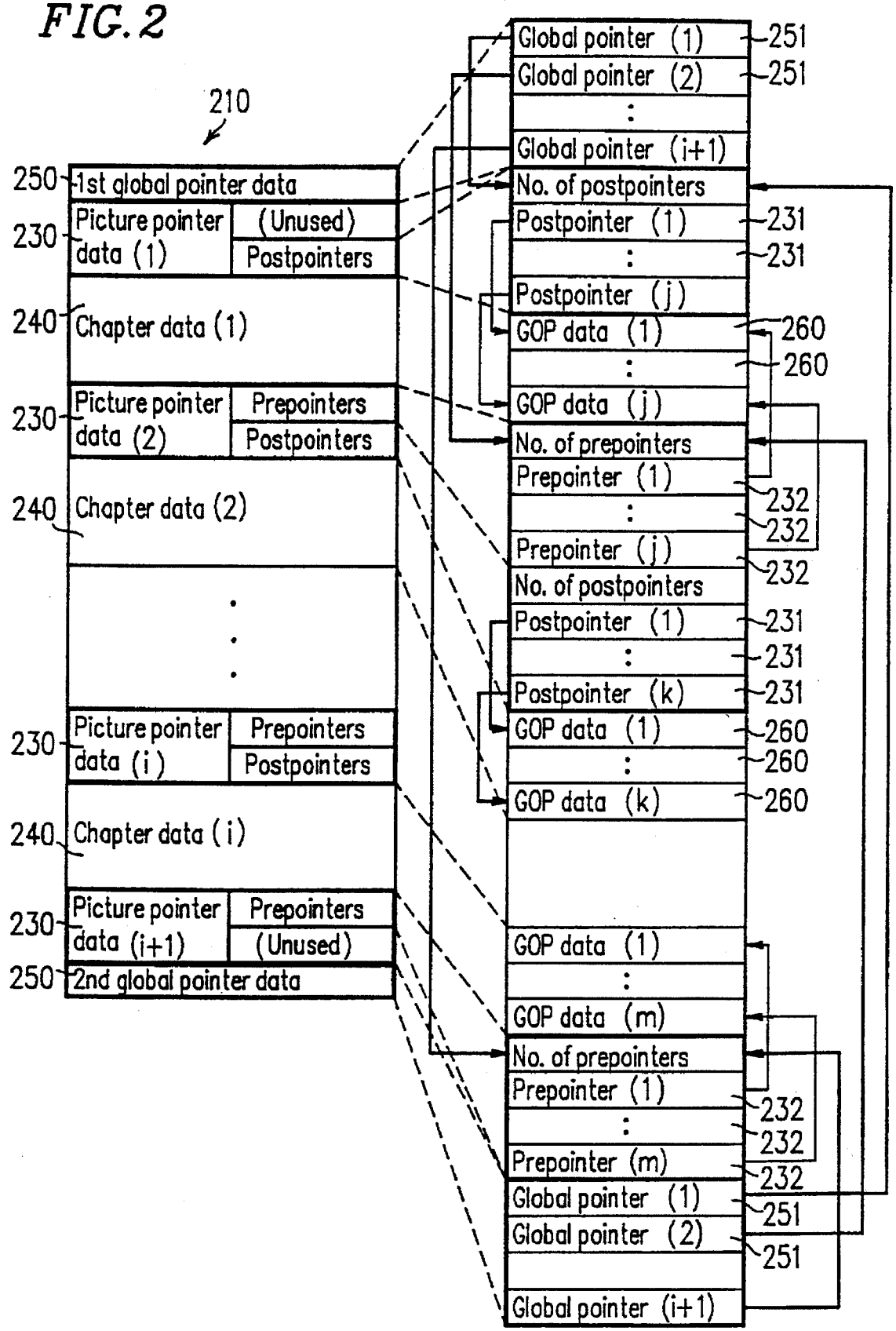
FIG. 2 shows the data structure of an AV file and the hierarchical structure of global pointer data and picture pointer data formed on the data recording medium of FIG. 1.

FIG. 2 shows the data structure of the AV file 210 shown in FIG. 1. As is shown in FIG. 2, picture pointer data 230 and chapter data 240 are alternately located in the AV file 210, wherein the first and second global pointer data 250 are located at the top and end portions, respectively. The global pointer data 250, the picture pointer data 230 and the chapter data 240 are recorded in units of a sector, and the global pointer data 250 and the picture pointer data 230 can be independently reproduced from the chapter data 240. In the AV file 210 of this example, the global pointer data 250 is recorded at the top and end portions of the AV file 210, whereas it is possible to record the global pointer data 250 at one of the portions.

The chapter data 240 is a partial data of the AV file 210, and is generated by dividing the compressed video data, which is generated by variable-bitrate-compressing the title as used in a movie in units of a picture, so as to achieve equal intervals of a constant display time (for example, 1 minute) or unequal intervals in accordance with respective continuous scenes having a similar display picture quality. The chapter data 240 is further divided into a plurality of GOP (group of pictures) data 260. Each of the GOP data 260 includes a compressed video data and a synchronized audio data with the video data, and in the case of a movie title, further includes a text data for the subtitle to be displayed simultaneously with the compressed video data. The compressed video data in each GOP data 260 includes one independent picture data, which is intra-frame compressed as an I picture defined in the MPEG standard as described in detail below. In conducting the trickplay mode operation such as the fast forward reproducing and the rewind reproducing, it is required to detect the location of the independent picture data in order to selectively reproduce the independent picture data.

As the video data is variable-bitrate-compressed, the locations of the independent picture data are disposed on the recording medium at unequal intervals. In the recording medium of the present invention, the location data of each independent picture data is registered in a picture pointer data which is arranged immediately before and after the independent picture data. Each of the picture pointer data 230 includes, as is shown in FIG. 2, a group of prepointers for managing all the independent picture data included in the chapter data 240 arranged immediately before that particular picture pointer data 230 and a group of postpointers for managing all the independent picture data included in the chapter data 240 arranged immediately after that particular picture pointer data 230.

The group of the prepointers is provided to the independent picture data, and includes a plurality of prepointers 232 each storing the location data of the corresponding one of the independent picture data and the number of the prepointers 232 included in the group of the prepointers (the number is recorded at the top portion of the group of the prepointers). Similarly, the group of the postpointers is provided to the independent picture data, and includes a plurality of postpointers 231 each storing the location data of the corresponding one of the independent picture data and the number of the postpointers 231 included in the group of the postpointers (the number is recorded at the top portion of the group of the postpointers). In the following description, when the prepointer 232 and the postpointer 231 are not distinguished from each other, both are referred to as a picture pointer. It is noted that in the first picture pointer data 230 in each AV file 210, the group of the postpointers alone is registered, and that in the last picture pointer data 230 in each AV file 210, the group of the prepointers alone is registered.

The global pointer data 250 includes a plurality of global pointers 251 corresponding to all the picture pointer data 230 which is included in one AV file 210. The location data of each of the picture pointer data such as a sector address is registered in the corresponding global pointer 251.

Figure 3:
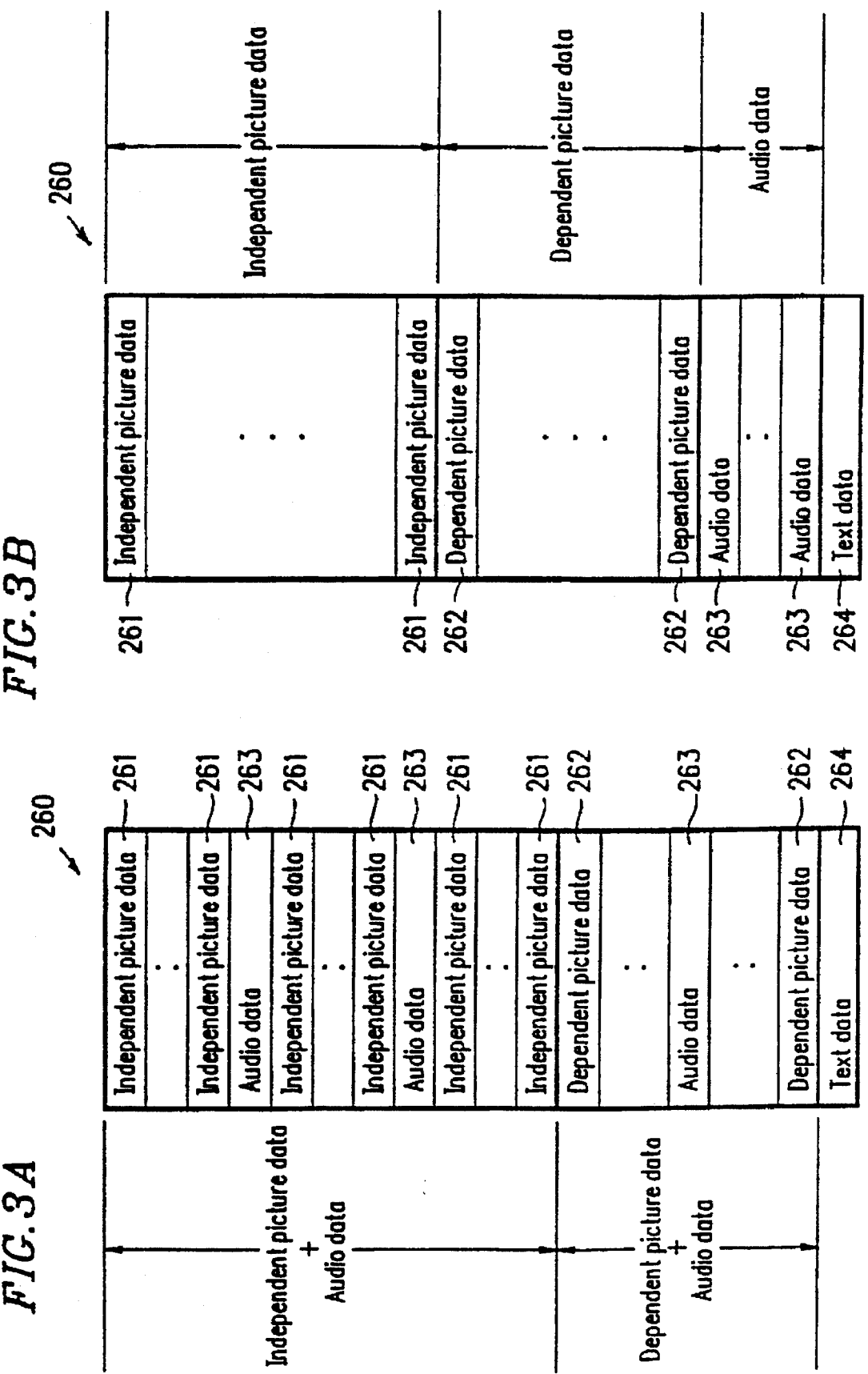
FIGS. 3A and 3B show examples of the data structure of a GOP data.

Next, the exemplified structures of the GOP data 260 will be described referring to FIGS. 3A and 3B. Each GOP data 260 includes, as described above, the compressed video data, the audio data and the text data synchronized with the video data. The compressed video data in each of the GOP data 260 includes one independent picture data 261 that is intra-picture (intra-flame or intra-field) compressed and dependent picture data 262 that are inter-picture (inter-frame or inter-field) compressed, and is recorded using a plurality of sectors. For example, in accordance with the MPEG standard, the independent picture data 261 corresponds to an I picture and the dependent picture data 262 corresponds to a P picture and/or a B picture. The compression encoding of the data can be performed in units of a field. Further, the following description in units of a picture is applicable to the compression in units of a frame or a field.

The GOP data 260 shown in FIG. 3A is interleave-formatted, in which the video data (the independent picture data 261 and the dependent picture data 262) and the audio data are interleaved in units of a sector. The independent picture data 261 is dividedly recorded in a plurality of continuous areas (i.e., areas including a plurality of sectors) in each GOP data 260. As the positional data for managing each independent picture data 261, the corresponding picture pointer stores, for example, the top and last addresses of the area where the independent picture data 261 and the audio data 263 are interleaved, or the start address of the interleaved area and the number of the sectors in the area.

The GOP data 260 shown in FIG. 3B is non-interleave-formatted, in which the video data (the independent picture data 261 and the dependent picture data 262), the audio data and the text data are recorded on the respective continuous areas on the recording medium. As the positional data for managing the independent picture data 261 recorded at the top portion of each GOP data 260, the corresponding picture pointer stores, for example, the address of the leading sector of one continuous area storing the independent picture data 261 and the number of the sectors in the area.

In conducting the trickplay mode operation for the GOP data 260 which is non-interleave-formatted as shown in FIG. 3B, the independent picture data 261 can be easily discriminated so as to be reproduced since it is recorded in one continuous area. On the other hand, the maximum time interval of reproducing the audio data 263 in ordinary operation becomes longer as compared with the case of interleaved format as shown in FIG. 3A, because the audio data 263 is also recorded in another continuous area. Accordingly, in the ordinary reproducing operation, the capacity of an audio data buffer required for temporarily storing the audio data 263 in the data reproducing apparatus becomes larger as compared with the case where the GOP data is interleave-formatted. When the interleave-formatted GOP data as shown in FIG. 3A is used, the capacity of the audio data buffer can be made smaller. In this case, however, the data reproducing apparatus is required to comprise means for discriminating the interleaved independent picture data 261 and audio data 263 in conducting the trickplay mode operation.

A specific example will now be described. When the location data of the independent picture data is managed by using the aforementioned hierarchical management data structure, the capacity of the global pointer data 250 and the picture pointer data 230 are calculated as follows: In this calculation, it is assumed that each chapter data is constructed from a video data for 1 minute in a movie title having a reproducing time of, for example, 135 minutes. In this case, the global pointer data 250 includes 135 global pointers 251. When an NTSC signal for displaying 30 pictures for 1 second is compressed under the condition of one GOP including 12 pictures, 150 prepointers 232 and 150 postpointers 231 are registered in each picture pointer data 230. When each of these pointers has, for example, a combination of the start address (an absolute value representation of four byte length) and the last address (an offset representation of two byte length) of the area where the independent picture data 261 and the audio data 263 are interleaved, the picture pointer data 230 has a capacity of 1,800 bytes, and is recorded by using one 2 KB sector. When it is assumed that the global pointer 250 indicating the location data of the picture pointer data has a sector address (four byte length representation) alone, the capacity thereof is 540 bytes. The global pointer data 250 is recorded on the medium using one sector. Further, in this case, the memory capacity required for temporarily storing the global pointer data 250 and the picture pointer data 230, which are read from the recording medium to retrieve the location of the independent picture data 261, is 4 KB (corresponding to two sectors). Thus, the buffer capacity of 80 KB described in the related art can be largely decreased.

Figure 4:
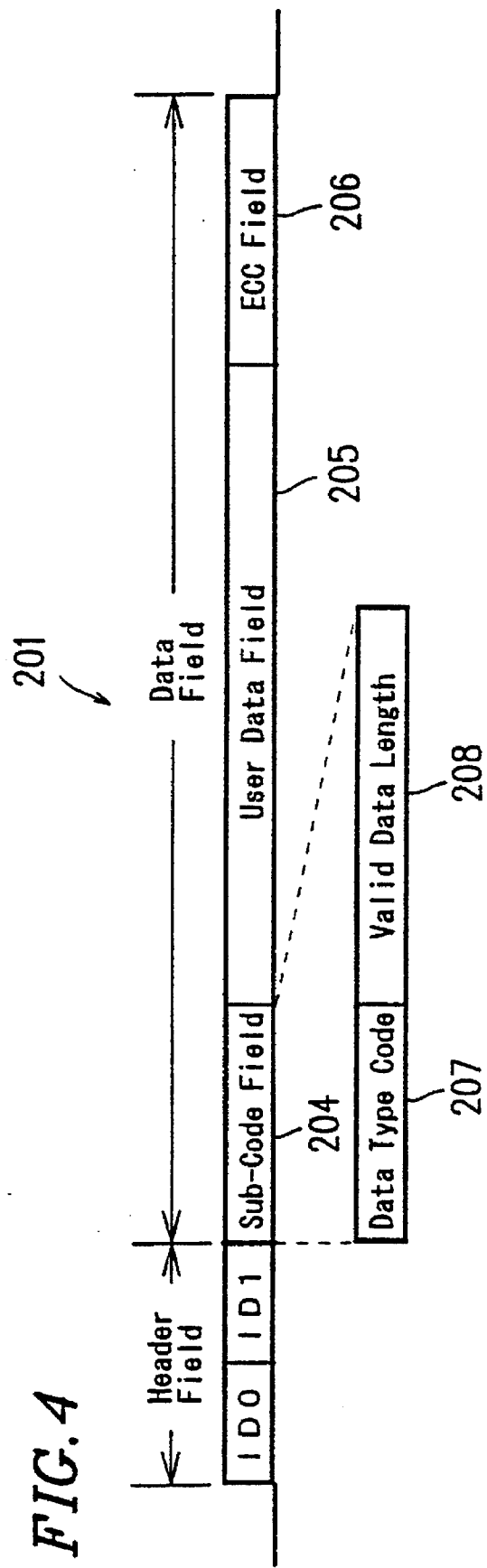
FIG. 4 shows the data structure in a physical sector.

FIG. 4 shows the data structure of the sector 201, which is a basic unit for performing the recording/reproducing operation using the data recording medium 200. As shown in FIG. 4, the sector 201 includes a header field and a data field. In the header field, the address data of the sector 201 such as ID0 and ID1 are multiply recorded. The data field includes a sub-code field 204, a user data field 205 and an error correction code (ECC) field 206.

The ECC field 206 stores an error correction code using, for example, a Reed-Solomon code for protecting the data in the sub-code field 204 and the user data field 205 from having an error on the recording medium. The user data field 205 stores control data such as the global pointer data 250 and the picture pointer data 230 and various data elements such as the video data which includes the independent picture data 261, the dependent picture data 262, the audio data 263 synchronized with the video data, and the text data 264 to be displayed simultaneously with the video data. The sub-code field 204 stores a data type code 207 for discriminating the contents of the user data with any of the control data, the video data, the audio data and the text data.

When each GOP data 260 is interleave-formatted as is shown in FIG. 3A, the data reproducing apparatus discriminates the interleaved independent picture data 261 from the audio data 263 by using the data type code 207, and selectively reproduces the independent picture data alone in the trickplay mode operation. Furthermore, when a padding data is added at the end of the user data field 205, the sub-code field 204 also stores a valid data length 208 and the like of the element data which is recorded in the user data field 205 with a fixed length. The valid data length 208 indicates the length of the element data excluding the padding data.

Although the global pointers 251 are recorded as the global pointer data 250 located at the top and/or end portions of each AV file 210 in this example, it is possible to locate the global pointers in another portion. For example, the global pointer data 250 can be plurally divided so as to be recorded together with the predetermined one of the picture pointer data 230.

As described above, in the data recording medium 200 of Example 1, the locations of the independent picture data located at unequal intervals are managed by using the hierarchical management data including the picture pointer data 230 for managing the location data of the respective independent picture data and the global pointer data 250 for managing the location data of the respective picture pointer data 230. When the data reproducing apparatus performs the trickplay mode operation using this recording medium 200, this apparatus never requires a bulk memory to store all the location data of the independent picture data. Accordingly, the data reproducing apparatus can attain a rapid trickplay mode operation by retrieving the locations of the respective independent picture data in a step-wise manner using memory circuits having a small capacity.

(EXAMPLE 2)

Figure 5:
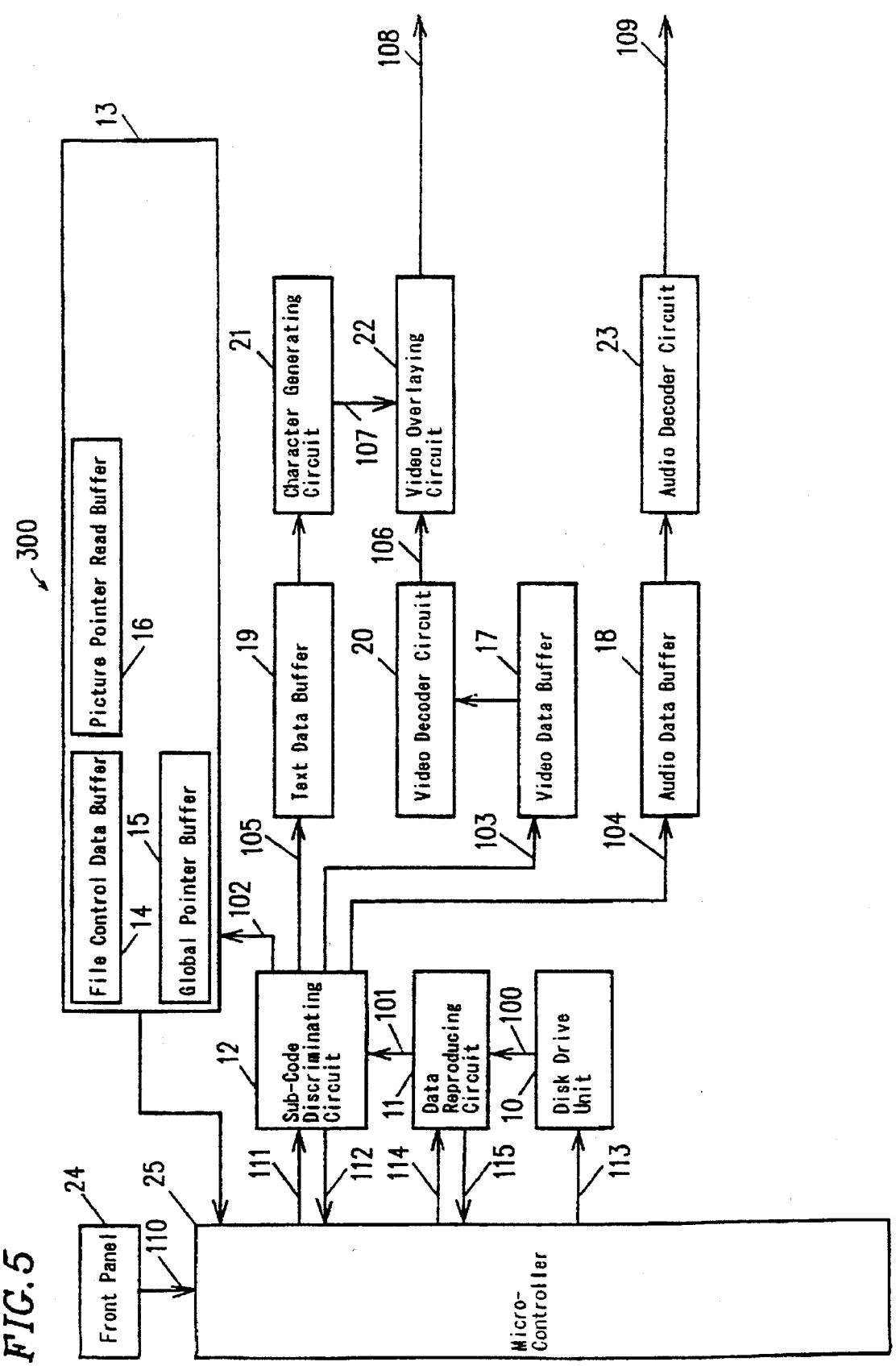
FIG. 5 is a block diagram of the configuration of a data reproducing apparatus according to one example of this invention.

FIG. 5 shows an example of a data reproducing apparatus 300 for conducting a data reproducing operation in units of a sector using the data recording medium 200 described in Example 1. As is shown in FIG. 5, the data reproducing apparatus 300 comprises a disk drive unit 10, a data reproducing circuit 11, a sub-code discriminating circuit 12, a control data buffer 13, a video data buffer 17, an audio data buffer 18, a text data buffer 19, a video decoder circuit 20, a character generating circuit 21, a video overlaying circuit 22, an audio decoder circuit 23, a front panel 24, and a microcontroller 25.

The disk drive unit 10 rotates the disk-shaped data recording medium 200 contained therein, and detects a certain sector 201 by moving the self-contained head (not shown) so as to read signals from the data field in the sector. Then, the disk drive unit 10 conducts signal processing such as amplification and binarization and outputs the thus obtained reproducing signal 100 to the data reproducing circuit 11. The data reproducing circuit 11 performs demodulation and error correction upon the reproducing signal 100 in units of a sector and transfers the thus obtained reproducing data 101 to the sub-code discrimination circuit 12. The reproducing data 101 includes the contents recorded in the sub-code field 204 and the user data field 205 as mentioned above with reference to FIG. 4. The sub-code discriminating circuit 12 interprets the sub-code contained in the reproducing data 101 to discriminate the data type code 207. Further, the sub-code discriminating circuit 12 removes the padding data by using the valid data length 208 stored in the sub-code field 204, and transfers the thus obtained control data 102, video data 103, audio data 104 and text data 105 to the corresponding circuits in accordance with the result of the data type code 207. In conducting the trickplay mode operation, the sub-code discrimination circuit 12 transfers only the user data having a specific data type code such as the independent picture data 261.

The control data buffer 13 is a memory circuit for temporarily storing the control data 102 transferred by the sub-code discriminating circuit 12, and is used dividedly as a file control data buffer 14, a global pointer buffer 15 and a picture pointer read buffer 16. The video data buffer 17, the audio data buffer 18, and the text data buffer 19 are memory circuits for temporarily storing the video data 103, the audio data 104, and the text data 105 transferred by the sub-code discriminating circuit 12, respectively.

The video decoder circuit 20 reads out the video data 103 from the video data buffer 17 for decoding so as to generate a reproducing picture signal 106. The character generating circuit 21 reads out the text data 105 from the text data buffer 19 so as to convert it into a text display signal 107. The video overlaying circuit 22 generates a video reproducing signal 108 by logically adding the reproducing picture signal 106 to the text display signal 107, and transfers the video reproducing signal 108 to an external video output apparatus such as a TV monitor. The audio decoder circuit 23 reads out the audio data 104 from the audio data buffer 18 for decompression, and transfers the thus generated audio reproducing signal 109 to an external audio output apparatus such as a loudspeaker.

The front panel 24, in a similar manner to the selection means in a CD player, selects a certain AV file specified by an operator among a large number of the AV files recorded on the data recording medium and controls the start and the stop of the reproducing operation. The front panel 24 is also used as a means for setting the reproducing operation mode such as the ordinary reproducing, the fast forward reproducing and the rewind reproducing. The microcontroller 25 controls the entire data reproducing apparatus 300 in accordance with an operation mode control signal 110 output from the front panel 24.

In the data reproducing apparatus having the aforementioned configuration, the operator selects the AV files and sets the operation mode through the front panel 24. When the data reproducing apparatus 300 is connected with a computer as a peripheral device like a CD-ROM drive unit, however, it is possible to select the AV files and set the operation mode by the host computer through a host interface circuit such as a SCSI control circuit.

Figure 6:
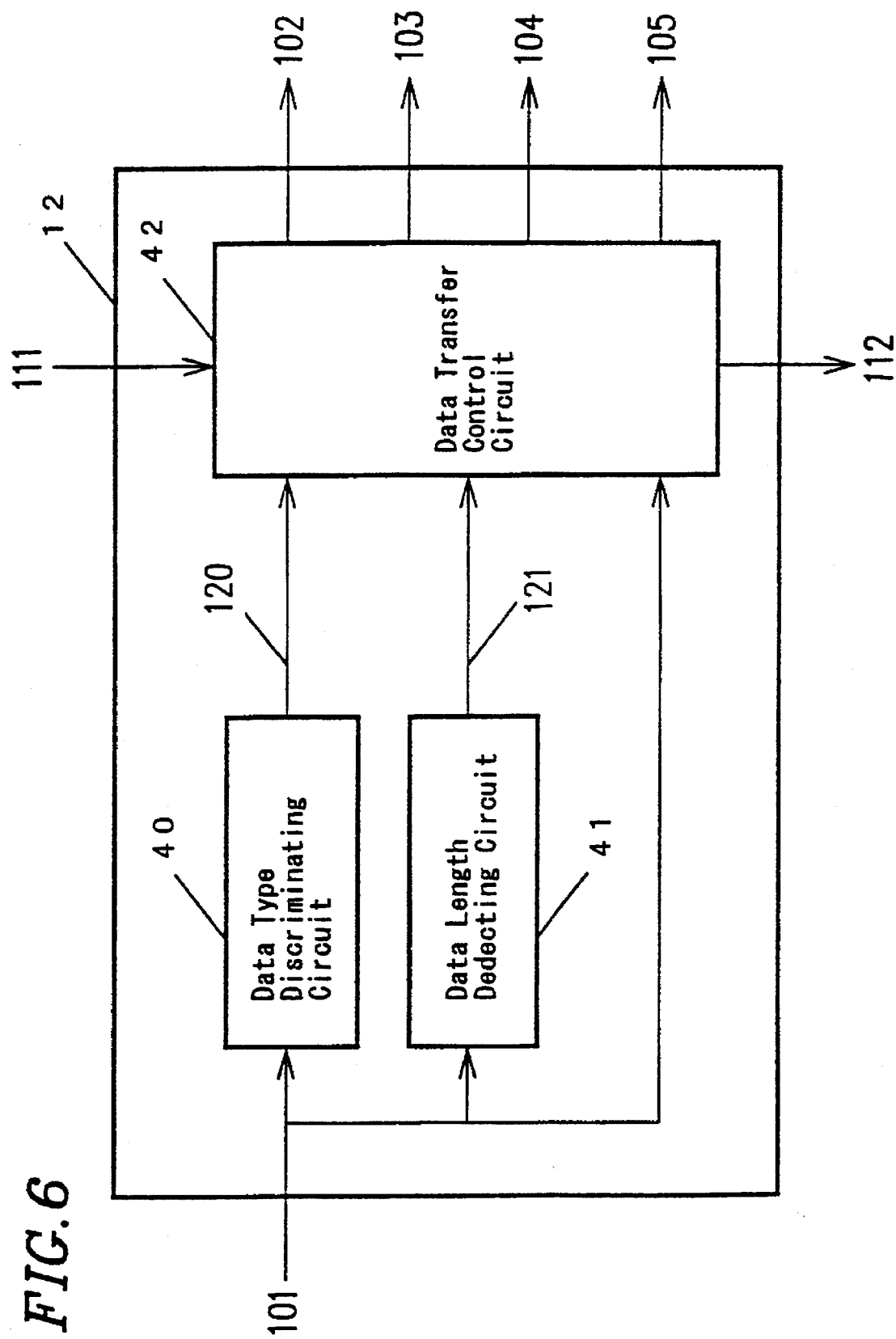
FIG. 6 is a block diagram of the configuration of a sub-code discriminating circuit.

FIG. 6 is an example of the configuration of the sub-code discriminating circuit 12 shown in FIG. 5. As shown in FIG. 6, the sub-code discriminating circuit 12 comprises a data type discriminating circuit 40, a data length detecting circuit 41, and a data transfer control circuit 42. The data type discriminating circuit 40 receives the reproducing data 101, discriminates the data type code 207 recorded in the sub-code field 204, and outputs a data type signal 120 to the data transfer control circuit 42. Similarly, the data length detecting circuit 41 receives the reproducing data 101, discriminates the valid data length 208 recorded in the sub-code field 204, and outputs a data count control signal 121 to the data transfer control circuit 42.

The data transfer control circuit 42 comprises a counter circuit, a selector circuit and the like, and controls the data transfer operation of the user data in accordance with the state of the reproducing mode control signal 111 which is set through the microcontroller 25. When the ordinary reproducing operation mode is set by the reproducing mode control signal 111, the data transfer control circuit 42 controls the selector circuit therein in accordance with the received data type signal 120, and also controls the counter circuit therein in accordance with the received data count control signal 121, thereby transferring any effective data among the control data 102, the video data 103, the audio data 104, and the text data 105 to the related circuits. When the transfer of data in an amount set by the data count signal 121 is completed, the data transfer control circuit 42 outputs a data transfer end signal 112 to the microcontroller 25, thereby terminating the data transfer operation.

Basic processing procedures for the data reproducing operation using the data reproducing apparatus 300 having the aforementioned configuration will now be described. When the control data 102 such as the file control data 220, the global pointer data 250, or the picture pointer data 230 are reproduced, the microcontroller 25 sets, in the disk drive unit 10, an address indicating the location of the control data 102 on the recording medium as a drive control signal 113. When the disk drive unit 10 finishes its seek operation, the microcontroller 25 sets, in the sub-code discriminating circuit 12, the reproducing mode control signal 111 indicating the ordinary reproducing operation. Further, in order to set an area where the control data 102 is recorded in the data reproducing circuit 11, the microcontroller 25 outputs the start address and the number of sectors of the area to be read out in the data reproducing circuit 11 as a reproducing operation control signal 114. The data reproducing circuit 11 discriminates the address signal recorded in the header field of each sector from the reproducing signal 100 and demodulates it, and detects whether or not the address matches with the address of the sector specified as the area to be reproduced. When the addresses are detected in order to be matched, the data reproducing circuit 11 demodulates and conducts the error correction for the reproducing signal 100 read from the data field, thereby generating the reproducing data 101. The data reproducing circuit 11 outputs to the microcontroller 25 a reproducing status signal 115 indicating whether the data reproducing of the specified area is normally finished or is abnormally finished because of the detection of an uncorrectable error due to a flaw on the recording medium or the like. When the reproducing operation is normally finished, the sub-code discriminating circuit 12 detects the data type code 207 and the valid data length 208 from the sub-code data included in the reproducing data 101. When the sub-code discriminating circuit 12 determines the contents of the user data 205 to be the control data 102 based on the data type code 207, the control data buffer 13 is set as the circuit for receiving the data, and the user data specified by the valid data length 208 (i.e., the user data excluding the padding data) is transferred to the control data buffer 13.

Next, the reproducing operation of the independent picture data 261 in the fast forward reproducing and the rewind reproducing will be described. The microcontroller 25 calculates the location of the independent picture data 261 by using the file control data 220, the global pointer data 250, and the picture pointer data 230 that was previously read out in the control data buffer 13. Then, the microcontroller 25 executes the seek operation in the same manner as in the reproducing operation for the control data 102. Next, the microcontroller 25 sets, in the sub-code discriminating circuit 12, the reproducing mode control signal 111 which instructs the selective reproduction of the independent picture data 261. Further, in order to set in the data reproducing circuit 11, a recording area of the independent picture data 261, the microcontroller 25 outputs the start address and the number of sectors of the area to be reproduced as the reproducing operation control signal 114. The data reproducing circuit 11 continuously conducts the demodulation and the error correction of all the sectors in the area that is determined to be reproduced, and transfers the reproducing data 101 to the sub-code discriminating circuit 12. The data type discriminating circuit 40 and the data length detecting circuit 41 in the sub-code discriminating circuit 12 detect the data type code 207 and the valid data length 208 from the reproducing data 101, and output the data type signal 120 and the data count control signal 121, respectively. When the data transfer control circuit 42 determines that the reproducing data 101 is the independent picture data based on the data type signal 120, the video data buffer 17 is set as the circuit for receiving the data, and the video data 103 specified by using the valid data length is transferred to the video data buffer 17.

Generally, when video data corresponding to an NTSC-TV signal is compressed, the capacity of the independent picture data 261 exceeds 100 KB. Therefore, in the reproducing operation of the independent picture data 261, the demodulation, the error correction, and the data transfer for a large number of the sectors are executed in parallel as pipeline processing, while discrimination of the data type code 207 and the valid data length 208 is performed. Further, when the trickplay mode operation is performed by using the recording medium as shown in FIG. 3A in which the independent picture data 261 and the audio data 263 are recorded in an interleave format in units of a sector, the sub-code discriminating circuit 12 can discriminate alone that is the independent picture data 261 that is to be transferred to the video data buffer 17 as described above.

Next, the processing procedures for the fast forward reproducing and the rewind reproducing by the data reproducing apparatus 300 using the data recording medium 200 having the data structure as shown in FIGS. 1 and 2 will be described. Here, it is assumed, for simplification, that the AV file 210 to be reproduced includes three chapter data 240 and that each of the chapter data 240 includes four GOP data 260. It is also assumed that the contents of the four picture pointer data 230 including the location data of the respective independent picture data 261 are set as listed in Table 1.

TABLE 1

|  | Prepointers | Postpointers |
|---|---|---|
| Picture Pointer Data 1 | (Unused) | Address (P1) |
|  | (Unused) | Address (P2) |
|  | (Unused) | Address (P3) |
|  | (Unused) | Address (P4) |

TABLE 1-continued

|  | Prepointers | Postpointers |
|---|---|---|
| Picture Pointer | Address (P1) | Address (P5) |
| Data 2 | Address (P2) | Address (P6) |
|  | Address (P3) | Address (P7) |
|  | Address (P4) | Address (P8) |
| Picture Pointer | Address (P5) | Address (P9) |
| Data 3 | Address (P6) | Address (P10) |
|  | Address (P7) | Address (P11) |
|  | Address (P8) | Address (P12) |
| Picture Pointer | Address (P9) | (Unused) |
| Data 4 | Address (P10) | (Unused) |
|  | Address (P11) | (Unused) |
|  | Address (P12) | (Unused) |

Figure 7:
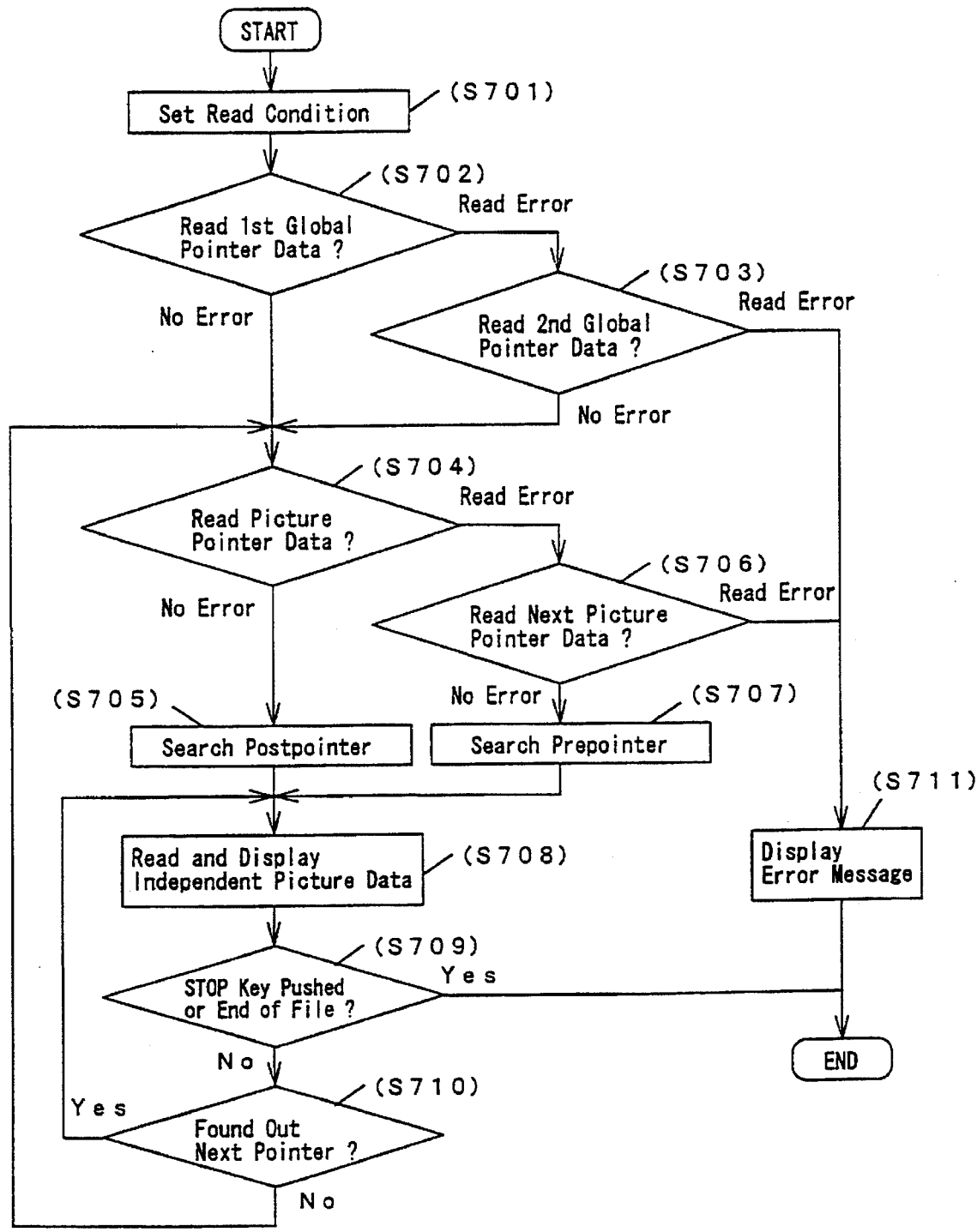
FIG. 7 is a flowchart for the processing procedures for a fast forward reproducing operation by using the data reproducing apparatus of the present invention.

FIG. 7 is a flowchart for the processing procedures for the fast forward reproducing performed by the data reproducing apparatus 300 using the AV file 210 having the aforementioned structure. The specific reproducing procedures will be described in accordance with the processing procedures (steps) shown in the flowchart. In the following description, it is assumed that the file control data 220 recorded on the data recording medium 200 has already been read out and stored in the file control data buffer 14, in accordance with the above-mentioned processing procedures when the recording medium was loaded in the disk drive unit 10 or reset.

(S701) An operator starts the reproducing operation by selecting an AV file 210 to be reproduced by using the front panel 24, and determines the operation mode for the fast forward reproducing from the start of the file. At this point, it is assumed that the fast forward reproducing speed is set so that every other piece of the independent picture data 261 are successively reproduced, i.e, in the order of the first, the third, the fifth, etc. (i.e., in an ascending order of odd numbers). Such a reproducing condition is supplied to the microcontroller 25 as the operation mode control signal 110 to be set.

(S702) The microcontroller 25 retrieves the location of the specified AV file 210 from the file control data in the file control data buffer 14. The microcontroller 25 executes the reproducing operation of the first global pointer data 250 recorded at the top portion of the AV file 210 in accordance with the same procedure as used for the file control data 220 described above. When this data reproducing operation is normally completed, the global pointer data 250 is stored in the global pointer buffer 15.

(S703) When the detection of an uncorrectable error is informed from the data reproducing circuit 11 in the step S702, the microcontroller 25 executes, as a recovery process, the reproducing operation of the second global pointer data 250 recorded at the end portion of the AV file 210 in accordance with the same procedure as used in the step S702.

(S704) In order to execute the fast forward reproducing operation from the top of the file, the microcontroller 25 retrieves the location of a picture pointer data 230(1) from the global pointer data 250. Then, the microcontroller 25 executes the reproducing operation of the picture pointer data 230(1). When this data reproducing operation is normally completed, the picture pointer data 230(1) is stored in the picture pointer read buffer 16.

(S705) The microcontroller 25 searches and retrieves the location of the independent picture data 261 for displaying from the postpointers 231 of the reproduced picture pointer data 230. Specifically, under this reproducing condition, an address P1 is detected as the postpointer 231 in the first searching operation, and address P5, P9 and the like are detected in the subsequent searching operations (See Table 1).

(S706) When the detection of an uncorrectable error is informed from the data reproducing circuit 11 in the step S704, as the recovery process, the microcontroller 25 executes the reproducing operation of a picture pointer data 230(2) which is the subsequent picture pointer data, in accordance with the same procedure as used in the step S704 (See Table 1).

(S707) The microcontroller 25 searches and retrieves the location of the independent picture data 261 for displaying from the prepointers 232 of the picture pointer data 230(2). Specifically, under this reproducing condition, the address P1 is detected as the prepointer 232 in the first searching operation, and the addresses P5, P9 and the like are detected in the subsequent searching operations (See Table 1).

(S708) When the location of the independent picture data 261 is detected, the microcontroller 25 stores video data 103 in the video data buffer 17 in accordance with the above-mentioned processing procedures. Next, the video decoder circuit 20 reads out the compressed video data from the video data buffer 17 for decompression. The reproducing picture signal 106 generated in the video decoder circuit 20 is output to the outside through the video overlaying circuit 22. The video decoder circuit 20 repeats the outputting and displaying the same expanded image until the subsequent independent picture data 261 is read out into the video data buffer 17. For example, in the case of an NTSC signal for displaying 30 pictures per 1 second, when the time required for the subsequent independent picture data 261 to be read out into the video data buffer 17 is at most 100 ms, the video decoder circuit 20 repeats displaying the same independent picture data 261 three times.

(S709) The microcontroller 25 detects whether or not a stop key provided on the front panel 24 is pushed (i.e., a stop command is input), and when pushed, the reproducing operation is terminated. Further, when the microcontroller 25 retrieves all the picture pointers to be searched, the microcontroller 25 detects that the AV file 210 is fast forward reproduced to the end and terminates this operation.

(S710) When the reproducing operation is not terminated in step S709, the microcontroller 25 searches and retrieves the postpointer 231 or the prepointer 232 corresponding to the subsequent independent picture data 261 in the picture pointer read buffer 16. In this explanation of the operation, the reproducing speed is set so that every other piece of the independent picture data 261 is successively displayed. Therefore, for example, when the address P1 is detected in step S705, the microcontroller 25 searches and retrieves the address P3 as the subsequent postpointer 231 or prepointer 232. When the subsequent picture pointer is detected, the microcontroller 25 executes the reproducing and displaying operations of the independent picture data 261 starting from the address P3 by returning to the step S708. When, for example, the address P3 is detected as the postpointer 231 in the step S705, the address P5, that is, the subsequent postpointer 231, is not included in the picture pointer data 230(1) which has been stored in the picture pointer read buffer 16. In this case, the microcontroller 25 executes the reproducing operation of the subsequent picture pointer data 230(2) by returning to the step S704 (See Table 1).

(S711) When the reproducing operations of the global pointer data 250 or the picture pointer data 230 are not normally completed in the steps S703 or the step S706, respectively, the microcontroller 25 suspends the fast forward reproducing operation and displays a data reproducing error message.

As described above, the data reproducing apparatus 300 of the present invention performs fast forward reproducing operations by previously reading out the global pointer data 250 and the picture pointer data 230 in the memory circuits, and successively reproducing and displaying the independent picture data 261 alone while retrieving the data in the memory circuits. In the step S708, 100 ms after displaying the nth independent picture data 261, the (n+2)th independent picture data 261 is displayed. That is to say, when a GOP includes 12 pictures, the picture located 24 pictures behind is displayed. Under this condition, one independent picture data 261, which is to be displayed 800 ms after (in the case of an NTSC signal) in the ordinary reproducing operation mode, is displayed 100 ms after, and hence, the fast forward reproducing operation is performed at a speed eight times as high as the ordinary reproducing. The reproducing speed in such a fast forward reproducing operation can be adjusted with ease by controlling the interval between the independent picture data 261 to be displayed and the number of repeat times of displaying each independent picture data 261 related to the interval.

In order to attain a higher speed of the fast forward reproducing, for example, the nth independent picture data is displayed for 100 ms, and then the (n+4)th independent picture data is displayed. Thus, the speed becomes 16 times as high as the ordinary reproducing. On the other hand, in order to attain a lower speed of the fast forward reproducing, for example, the entire independent picture data 261 are displayed at intervals of 100 ms each. Thus, the speed is decreased in order to be four times as fast as ordinary reproducing. Further, when the number of repeat times of displaying the independent picture data 261 is decreased, the fast forward reproducing speed is increased, and when the number is increased, the speed is decreased. As described above with referring to FIG. 3, each picture pointer data 230 includes, for example, 150 prepointers 232 and 150 postpointers 231. Accordingly, when the fast forward reproducing speed is varied while displaying an image, or when an uncorrectable error is detected in the independent picture data 261, such a state can be dealt with by changing the retrieving condition of the picture pointer data 230 through the microcontroller 25. For example, when an error is detected in one independent picture data 261, the microcontroller 25 can easily execute an error recovery process so that the subsequent independent picture data 261 is displayed instead.

Figure 8:
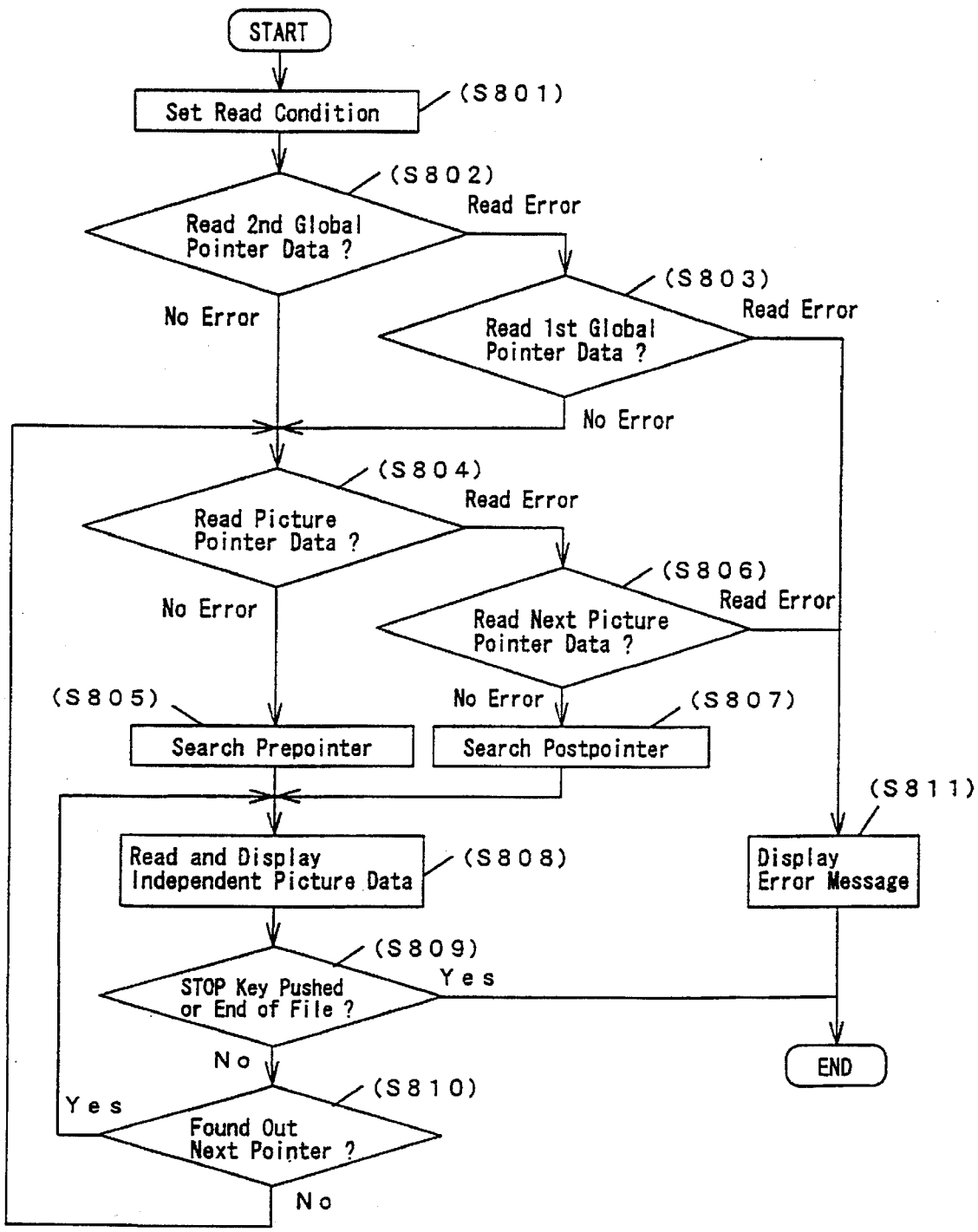
FIG. 8 is a flowchart for the processing procedures for a rewind reproducing operation by using the data reproducing apparatus of the present invention.

Next, the processing procedures for the rewind reproducing by the data reproducing apparatus 300 using the AV file 210 having the data structure of the picture pointer data 230 as listed in Table 1 will be described with referring to a flowchart shown in FIG. 8. Also in the following description, it is assumed that the file control data 220 have already been read out and stored in the file control data buffer 14, in accordance with the aforementioned processing procedures.

(S801) The operator starts the reproducing operation by selecting an AV file 210 for reproducing through the control panel 24, and determines the operation mode for the rewind reproducing from the end of the file. At this point, it is assumed that the rewind reproducing speed is set so that every other pieces of the independent picture data have been successively reproduced in the order of the last data, the last but two, the last but four, etc. Such a reproducing condition is set in the microcontroller 25 as the operation mode control signal 110.

(S802) The microcontroller 25 searches and retrieves the location of the specified AV file 210 from the file control data in the file control data buffer 14. The microcontroller 25 executes the reproducing operation of the second global pointer data 250 recorded at the end portion of the AV file 210. When this data reproducing operation is normally completed, the global pointer data 250 is stored in the global pointer buffer 15.

(S803) When the detection of an uncorrectable error is informed from the data reproducing circuit 11 in the step S802, the microcontroller 25 executes, as a recovery process, the reproducing operation of the first global pointer data 250 recorded at the top portion of the AV file 210 in accordance with the same procedure as used in the step S802.

(S804) In order to execute the rewind reproducing operation from the end of the file, the microcontroller 25 searches and retrieves the location of a picture pointer data 230(4) from the global pointer data 250. Then, the microcontroller 25 executes the reproducing operation of the picture pointer data 230(4). When this data reproducing operation is normally completed, the picture pointer data 230(4) is stored in the picture pointer read buffer 16.

(S805) The microcontroller 25 searches and retrieves the location of the independent picture data 261 for displaying from the prepointers 232 of the reproduced picture pointer data 230(4). Specifically, under this reproducing condition, an address P12 is detected as the prepointer 232 in the first searching operation, and addresses P8, P4 and the like are detected in the subsequent searching operations (See Table 1).

(S806) When the detection of an uncorrectable error is informed from the data reproducing circuit 11 in the step S804, as the recovery process, the microcontroller 25 executes the reproducing operation of a picture pointer data 230(3) which is the subsequent picture pointer data, in accordance with the same procedure as used in the step S804 (See Table 1).

(S807) The microcontroller 25 searches and retrieves the location of the independent picture data 261 for displaying from the postpointers 231 of the picture pointer data 230(3). Specifically, under this reproducing condition, the address P12 is detected as the postpointer 231 in the first searching operation, and the addresses P8, P4 and the like are detected in the subsequent searching operations (See Table 1).

(S808) When the location of the independent picture data 261 is detected, the microcontroller 25 stores the video data 103 in the video data buffer 17 in accordance with the above-mentioned processing procedures. Next, the video decoder circuit 20 reads out the compressed video data from the video data buffer 17 for decompression. The reproducing picture signal 106 generated in the video decoder circuit 20 is output to the outside through the video overlaying circuit 22 to be displayed. The video decoder circuit 20 repeats outputting and displaying the same expanded image until the subsequent independent picture data 261 is read out into the video data buffer 17. For example, in the case of an NTSC signal for displaying 30 pictures per 1 second, when the time required for the subsequent independent picture data 261 to be read out into the video data buffer 17 is at most 100 ms, the video decoder circuit 20 repeats displaying the same independent picture data 261 three times.

(S809) The microcontroller 25 detects whether or not the stop key provided on the front panel 24 is pushed (i.e., a stop command is input), and when pushed, the reproducing operation is terminated. Further, when the microcontroller 25 retrieves all the picture pointers to be searched, the microcontroller 25 detects that the AV file 210 is rewind and reproduced to the top and terminates this operation.

(S810) When the reproducing operation is not terminated in step S809, the microcontroller 25 searches and retrieves the prepointer 232 or the postpointer 231 corresponding to the subsequent independent picture data 261 in the picture pointer read buffer 16. In this explanation of the operation, the reproducing speed is set so that every other piece of the independent picture data 261 are successively displayed. Therefore, for example, when the address P12 is detected in step S805, the microcontroller 25 searches and retrieves the address P10 as the subsequent prepointer 232 or postpointer 231. When the subsequent picture pointer is detected, the microcontroller 25 executes the reproducing and displaying operations of the independent picture data 261 starting from the address P10 by returning to step S808. When, for example, the address P10 is detected as the prepointer 232 in the step S805, an address P8, that is, the subsequent prepointer 232, is not included in the picture pointer data 230(4) which has been stored in the picture pointer read buffer 16. In this case, the microcontroller 25 executes the reproducing operation of the subsequent picture pointer data 230(3) by returning to the step S804 (See Table 1).

(S811) When the reproducing operations of the global pointer data 250 or the picture pointer data 230 are not normally completed in the steps S803 or the step S806, respectively, the microcontroller 25 suspends the rewind reproducing operation and displays a data reproducing error message.

As described above with reference to FIG. 8, the data reproducing apparatus 300 of the present invention executes the rewind reproducing by previously reading out the global pointer data 250 and the picture pointer data 230 in the memory circuits, and retrieving the read pointer data in order to determine the location of the independent picture data 261, thereby successively reproducing and displaying the independent picture data 261 alone from the end of the AV file 210. The reproducing speed of such a rewind operation can be, similarly to the fast forward operation described above, made faster or slower by controlling the interval between the independent picture data 261 for displaying or the number of the repeat times of displaying each respective independent picture data 261. Further, it is apparent that the change of the reproducing speed during the display and the detection of an uncorrectable error in the independent picture data can be dealt with similarly to the case of the fast forward reproducing.

The above described fast forward reproducing and rewind reproducing are executed by using the AV file having the data structure as shown in FIG. 2 in which the global pointer data 250 and the picture pointer data 230 are doubly recorded. The data reproducing apparatus 300 can, however, perform the trickplay mode operation by using a recording medium in which the global pointer data 250 and the picture pointer data 230 are not multiply recorded. For example, when the rewind reproducing is performed by using a recording medium where the postpointers 231 alone are recorded, the microcontroller 25 performs the procedure in the step S806 while always regarding that an uncorrectable error is detected in step S804. Thus, it is possible to read the postpointers 231 required for the retrieval. Similarly, it is also possible to perform the fast forward reproducing by using a recording medium where the prepointers 232 alone are recorded. When a recording medium where the global pointer data 250 and the picture pointer data 230 are not doubly recorded is used, however, the microcontroller 25 cannot perform the error recovery operation described in the steps S703 and S706. Accordingly, when the control data 102 stored in such a recording medium includes an uncorrectable error, it is impossible to display the entire AV file 210 or the entire chapter data 240 in the trickplay mode operation.

In each of the AV files 210, the doubly recorded global pointer data 250 and picture pointer data 230 are used for both the purpose of conducting the trickplay mode operation normally and performing the error recovery. Specifically, the first global pointer data 250 and the postpointers 231 in each picture data 230 are used not only for the normal fast forward reproducing but also for the error recovery in the rewind reproducing. The second global pointer data 250 and the prepointers 232 are used for both the normal rewind reproducing and the error recovery in the fast forward reproducing. In this manner, the global pointer data 250 and the postpointers 231 for the fast forward (forward direction) reproducing and the global pointer data 250 and the prepointers 232 for the rewind (reverse direction) reproducing are separately provided. Accordingly, required data can be retrieved without going backward and jumping into the respective reproducing operations, resulting in easy control of the retrieval and efficient trickplay mode.

In conventional double recording used for general error recovery, the address data are doubly recorded, for example, by using two continuous areas as in the header field shown in the sector format of FIG. 4. This type of double recording may result in insufficient reliability of the stored data, since, for example, both data of these two areas are defective when one defect occurs on the boundary between the two areas. In order to cover this disadvantage, if the same data are triply recorded or an error detection code is added, the capacity overhead is apparently increased. The double recording of the global pointer data 250 and the picture pointer data 230 in the present invention is largely different from this conventional technique in the following two points: First, although these pointers are disposed mainly for efficiently controlling the fast forward reproducing and the rewind reproducing, they also usefully serve for conducting the error recovery. Secondly, these doubly recorded pointers are dispersedly recorded on different areas on the recording medium, the reliability of the stored data is comparatively higher than in the conventional double recording technique. Thus, the double recording of the pointer data in the present invention is practically effective both in the trickplay mode operation and the error recovery operation.

On the other hand, the chapter data has a much larger capacity than the pointer data, and hence, the double recording of the chapter data is not practical. Accordingly, when an uncorrectable error is detected in reproducing the independent picture data 261, the data reproducing apparatus 300 works as follows: When an uncorrectable error is detected, the data reproducing circuit 11 informs the microcontroller 25 of the occurrence of the error without transferring the reproducing data 101. At this point, the microcontroller 25 informs the video decoder circuit 20 of the detection of the error in the video data to be transferred to the video data buffer 17, and simultaneously suspends reproducing the independent picture data 261 including the error, and starts reproducing the subsequent independent picture data 261. The video decoder circuit 20 repeatedly outputs and displays the presently displayed image until the subsequent independent picture data 261 is read out in the video data buffer 17. Thus, the independent picture data 261 including the error is not displayed but skipped. Accordingly, although the smoothness of the video is partly spoiled, the trickplay mode operation is executed without being suspended.

As described above, in the data reproducing apparatus 300 and the reproducing method using the data reproducing apparatus 300 of the present invention, the locations of the independent picture data disposed at unequal intervals are retrieved and reproduced by using the hierarchical management data including the global pointer data 250 and the picture pointer data 230. Therefore, the data reproducing apparatus 300 never requires a bulk memory to store all the location data of the independent picture data 261 in the trickplay mode operation. Thus, it is possible to retrieve the locations of the respective independent picture data in a stepwise manner by using the memory circuits with small capacity, thereby performing a rapid trickplay mode operation.

Further, the global pointer data 250 is doubly recorded by using the first and the second global pointer data at the top and the end portions of each AV file, and the picture pointer data 230 is doubly recorded by using the postpointers 231 and the prepointers 232. When an error occurs in one of the doubly recorded data, the other is used for the trickplay mode operation, thereby largely enhancing the error recovery function without largely increasing the data capacity.

(EXAMPLE 3)

Figure 9:
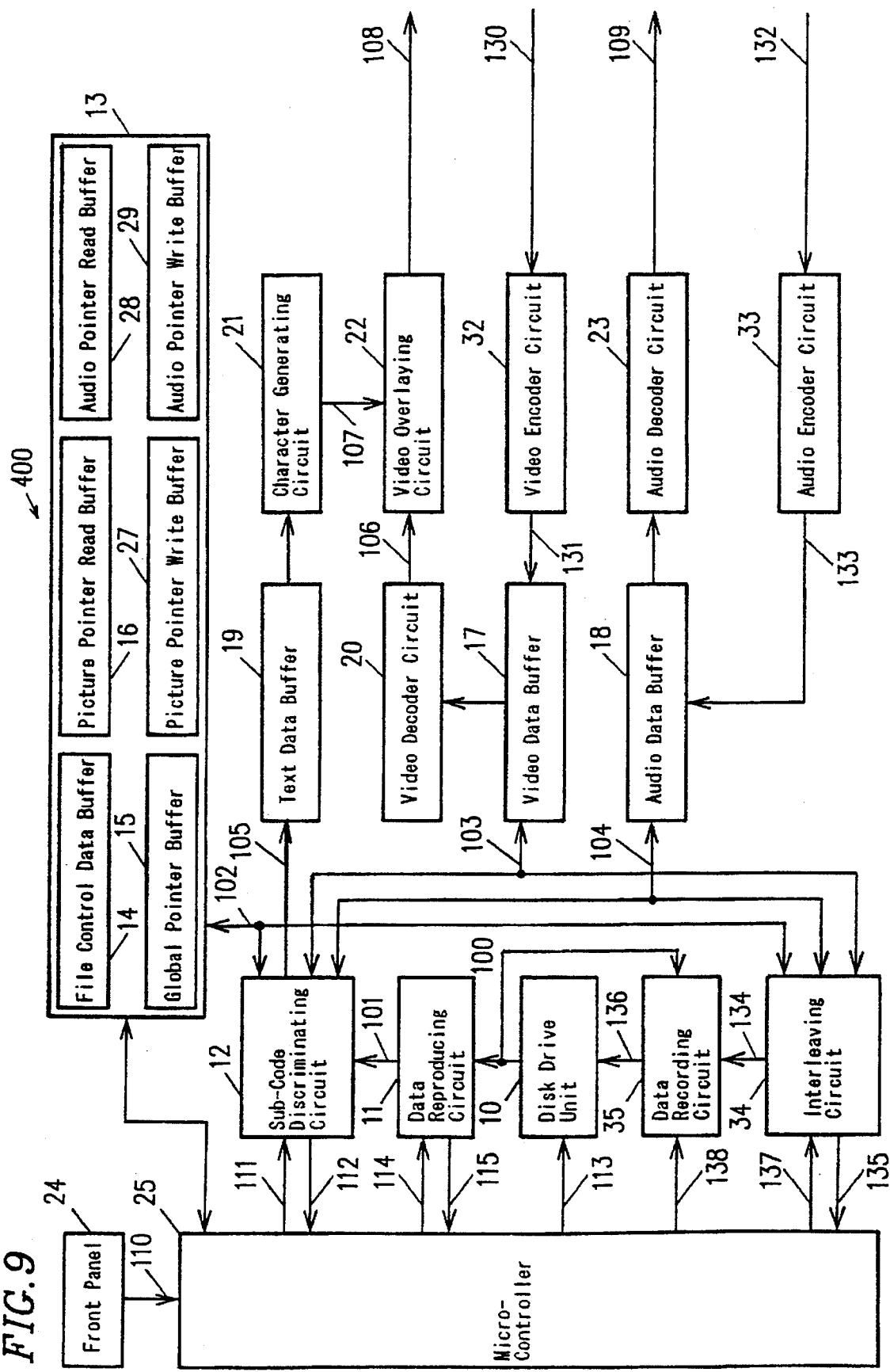
FIG. 9 is a block diagram of the configuration of a data recording/reproducing apparatus according to one example of the present invention.

Next, a data recording/reproducing apparatus having a postrecording function for rewriting an audio data alone and a data recording/reproducing method by using the apparatus will be described referring to the accompanying drawings. FIG. 9 is a block diagram showing an exemplifying configuration of a data recording/reproducing apparatus 400 performing a data recording/reproducing operation by using a data recording medium in which data are recorded and reproduced in units of a sector. As is shown in FIG. 9, in the data recording/reproducing apparatus 400, the configuration of a block from the disk drive unit 10 to the microcontroller 25 is identical to that of the data reproducing apparatus 300 shown in FIG. 5. The data recording/reproducing apparatus 400 further comprises a video encoder circuit 32, an audio encoder circuit 33, an interleaving circuit 34 and a data recording circuit 35. The control data buffer 13 is further divided so as to work as a picture pointer write buffer 27, an audio pointer read buffer 28, and an audio pointer write buffer 29 as well as the file control data buffer 14, the global pointer buffer 15 and the picture pointer read buffer 16.

The video encoder circuit 32 performs variable-bitrate-compression on an externally input video recording signal 130 in units of a picture. Then, the video encoder circuit 32 adds, in accordance with the sector format shown in FIG. 4, the sub-code data 204 including the data type code 207 and the valid data length 208 and the padding data, if necessary, to the compressed data, thereby generating a compressed picture data 131 having a data size integral times as large as the sector length. The audio encoder circuit 33 compresses an externally input audio recording signal 132, and adds the sub-code data 204 and the padding data, if necessary, to the compressed data, thereby generating a compressed audio data 133 having a data size an integral number times as large as the sector length. The thus generated compressed picture data 131 and compressed audio data 133 are temporarily stored in the video data buffer 17 and the audio data buffer 18, respectively in units of a sector. The interleaving circuit 34 reads out the compressed picture data 131 and the compressed audio data 133 included in one GOP in units of a sector, and performs an interleaving process in accordance with a predetermined algorithm, thereby generating the GOP data 260 having the format as shown in FIG. 3A or 3B. Then, the GOP data 260 is transferred to the data recording circuit 35 as one of recording data 134. Further, the interleaving circuit 34 transfers to the microcontroller 25 an interleave data 135 indicating the location of the audio data 263 and the independent picture data 261 in the GOP data 260 during the interleaving process. The audio pointer write buffer 29 and the picture pointer write buffer 27 temporarily store an audio pointer data 430 and a picture pointer data 230 generated by the microcontroller 25 in accordance with the interleave data 135, respectively. The audio pointer read buffer 28 temporarily stores the audio pointer data 430 read out from the recording medium. The data recording circuit 35 adds an error correction code to the recording data 134 and modulates the resultant data to be output as a recording signal 136. The recording data 134 includes not only the GOP data 260 but also the control data 102 transferred from the control data buffer 13. Accordingly, the selector circuit in the interleaving circuit 24 switches the contents of the recording data 134 to be transferred in accordance with a data switching signal 137 input from the microcontroller 25.

Figure 10:
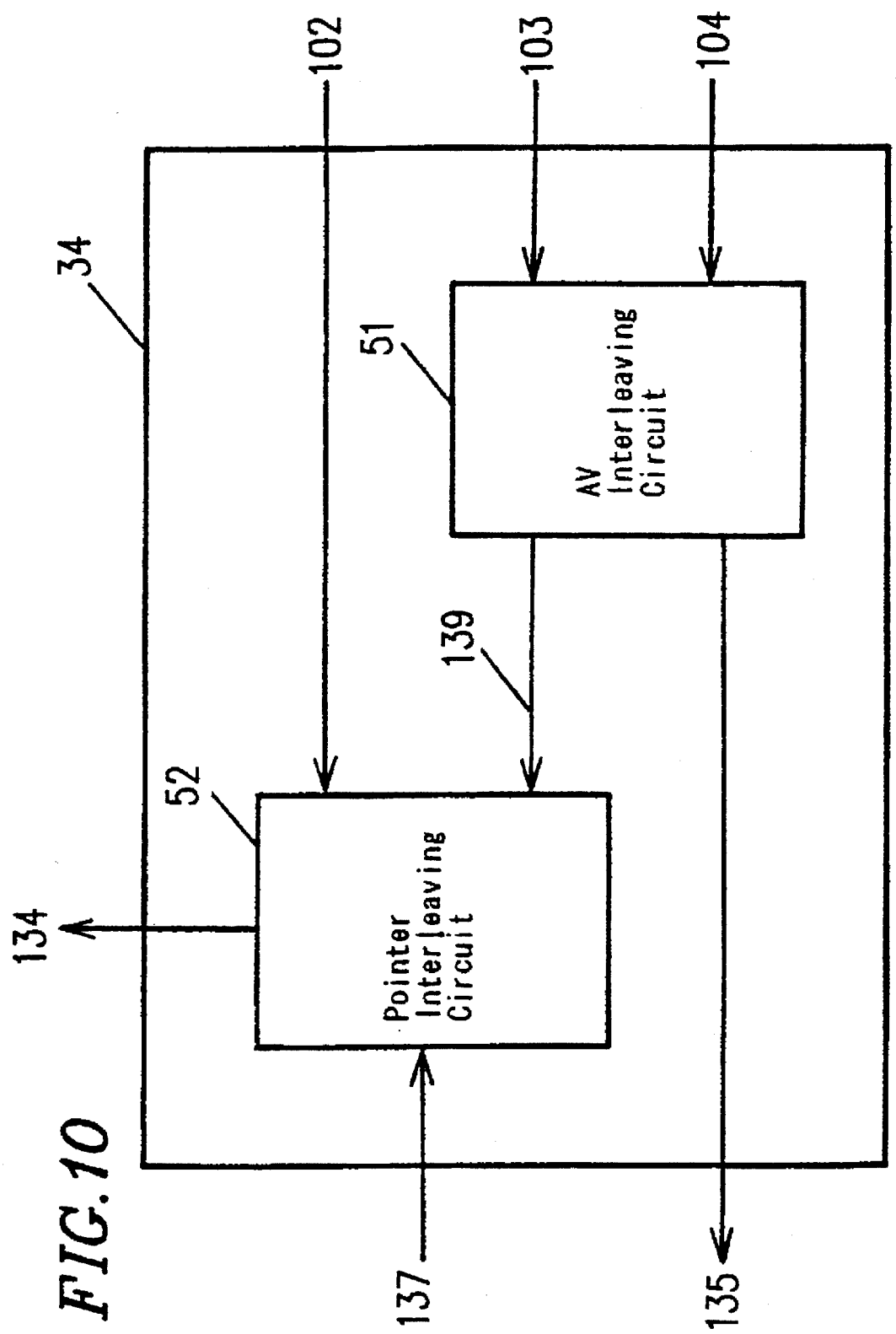
FIG. 10 is a block diagram of the configuration of an interleaving circuit.

FIG. 10 is a block diagram showing an exemplified configuration of the interleaving circuit 34 shown in FIG. 9. As is shown in FIG. 10, the interleaving circuit 34 comprises an AV interleaving circuit 51 and a pointer interleaving circuit 52.

The AV interleaving circuit 51 contains a microprocessor and the like (not shown) for executing the interleaving process of the compressed picture data 131 and the compressed audio data 133 in accordance with the predetermined algorithm. The microprocessor monitors the capacity of the compressed picture data 131 and the compressed audio data 133 respectively stored in the video data buffer 17 and the audio data buffer 18, and maintains the condition for preventing these data from overflowing or underflowing. Under such a condition, the microprocessor controls the reading out of the video data 103 and the audio data 104 from the video data buffer 17 and the audio data buffer 18, respectively in units of the sector to be interleaved. In the AV interleaving circuit 51, the GOP data 206 is generated through the interleaving process, and the obtained GOP data 260 is transferred to the pointer interleaving circuit 52 as a GOP data signal 139. The AV interleaving circuit 51 also transfers the location data of the independent picture data 261 and the audio data 263 included in the generated GOP data 260 to the microcontroller 25 as the interleave data 135.

The pointer interleaving circuit 52 is a selector circuit for transferring the control data 102 or the GOP data 260 read out from the control data buffer 13 to the data recording circuit 35 in accordance with the data switching signal 137 output from the microcontroller 25. The microcontroller 25 outputs the data switching signal 137 for selecting the GOP data 260 in the recording operation of the chapter data and for selecting the control data 102 in recording operation of the global pointer data 250, the picture pointer data 230, and the audio pointer data 430, thereby switching the contents of the recording data 134.

Figure 11:
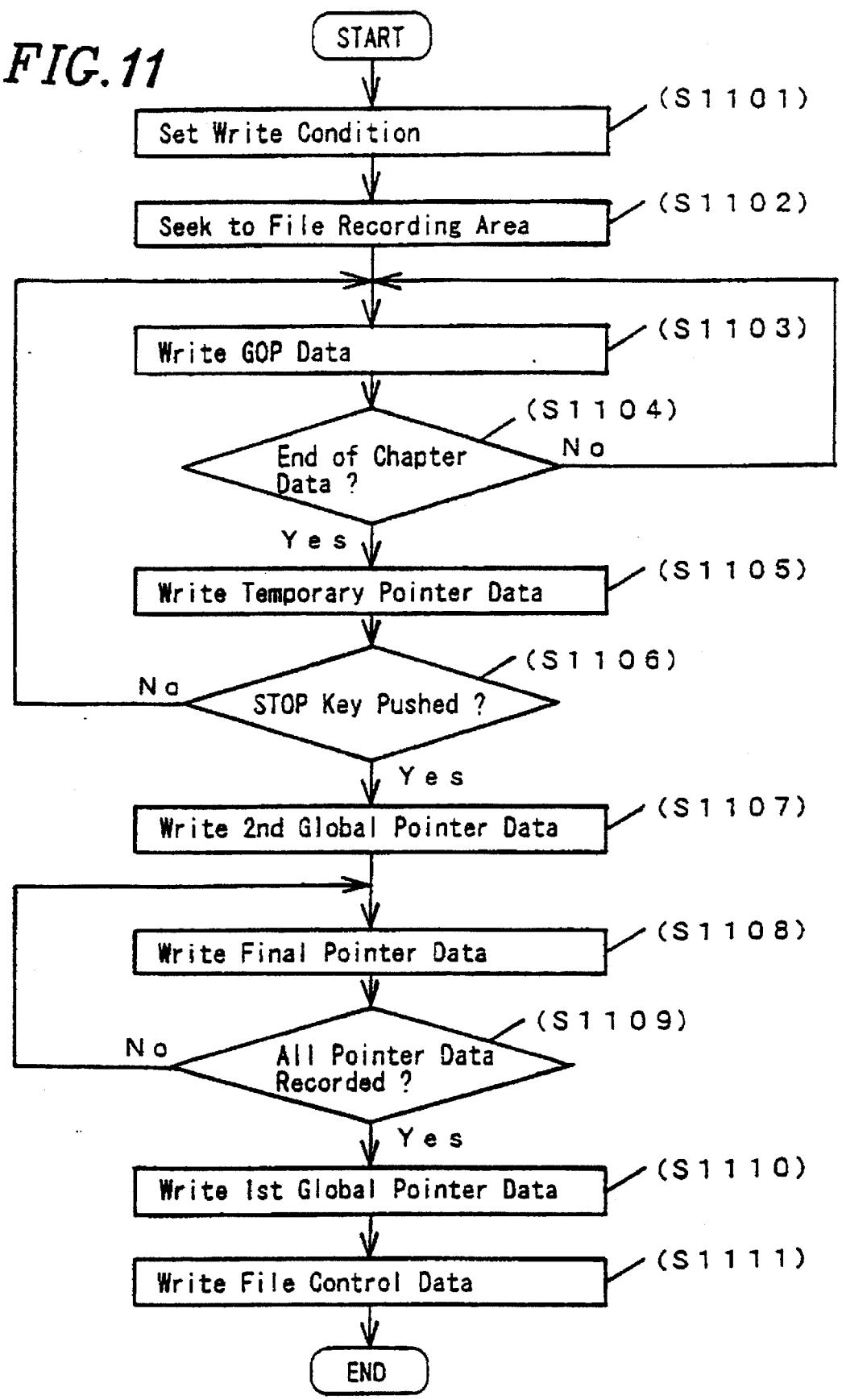
FIG. 11 is a flowchart for the processing procedures for an ordinary recording operation by using the data recording/reproducing apparatus of the present invention.

Next, an ordinary recording operation for an AV file 410 (described below referring to FIG. 12) by the data recording/reproducing apparatus 400 having the aforementioned configuration will be described with reference to a flowchart shown in FIG. 11.

(S1101) An operator starts the recording operation by determining the recording start position in the AV file 410 and selecting the ordinary recording operation mode through the front panel 24. Such a recording condition is set in the microcontroller 25 as the operation mode control signal 110.

(S1102) The microcontroller 25 calculates the address of a starting sector for storing the first chapter data 440 by adding the number of sectors for recording the global pointer data 450, the picture pointer data 230 and the audio pointer data 430 at the top portion of the AV file 410 to the address of the determined recording start position. Then, the microcontroller 25 sets the calculated address in the disk drive unit 10 as the drive control signal 113, and instructs the execution of the seek operation. The microcontroller 25 also sets the address in the data recording circuit 35 as a recording operation control signal 138.

(S1103) The microcontroller 25 actuates the video encoder circuit 32 and the audio encoder circuit 33. The compressed picture data 131 and the compressed audio data 133 respectively generated by the video encoder circuit 32 and the audio encoder circuit 33 are stored in the video data buffer 17 and the audio data buffer 18, respectively, in units of a sector. The interleaving circuit 34 interleaves the compressed picture data 131 and the compressed audio data 133 in accordance with the predetermined algorithm, while reading them out in units of a sector, and the thus generated GOP data is transferred as the recording data 134. The interleaving circuit 34 simultaneously transfers to the microcontroller 25 the location of the audio data 470 and the independent picture data 261 in the GOP data as the interleave data 135. The data recording circuit 35 discriminates an address signal previously recorded at the header field of each sector from the reproducing signal 100 and demodulates the discriminated signal, and detects whether or not it is matched with the address set as the recording operation control signal 138 in step S1102. When the addresses are matched, the data recording circuit 35 writes the recording signal 136 generated through the ECC process and the modulation process of the recording data 134 in the data field of that particular sector. Such a data recording operation is continuously performed on all the sectors contained in the GOP. Further, while recording the data on the recording medium, the microcontroller 25 generates respective prepointers of the audio pointer data 430 and the picture pointer data 230 based on the interleave data 135 transferred from the interleaving circuit 34, and the generated prepointers are stored in the audio pointer write buffer 29 and the picture pointer write buffer 27. At this point, the microcontroller 25 simultaneously updates the number of the registered prepointers in the audio pointer write buffer 29 and the picture pointer write buffer 27.

(S1104) The data recording operation on each GOP described in step S1103 is repeated a predetermined number of times. When the recording operation of the GOP data is repeated the predetermined number of times, the recording operation of the chapter data 240 is completed.

(S1105) When the recording operation of the chapter data 240 is completed, the picture pointer write buffer 27 and the audio pointer write buffer 29 respectively store the picture pointer data 230 and the audio pointer data 430 including the prepointers alone. The microcontroller 25 outputs the data switching signal 137 for transferring these pointer data to the data recording circuit 35. The interleaving circuit 34 reads out these pointer data from the control data buffer 13 to be transferred to the data recording circuit 35. The data recording circuit 35 writes the picture pointer data and the audio pointer data in areas immediately after the area where the chapter data is written. The interleaving circuit 34 transfers the location data of these pointer data to the microcontroller 25 as the interleave data 135. The microcontroller 25 generates global pointers 451 for indicating the locations of the picture pointer data 230 and the audio pointer data 430 from the interleave data 135, and stores them in the global pointer buffer 15. At this point, the microcontroller 25 simultaneously updates the number of the registered global pointers in the global pointer buffer 15.

(S1106) The microcontroller 25 detects whether or not the stop key provided on the front panel 24 is pushed (i.e., a stop command is input). If not, the microcontroller 25 outputs to the interleaving circuit 34 the data switching signal 137 for transferring the compressed picture data 131 and the compressed audio data 133 to the data recording circuit 35.

(S1107) When the stop key is detected to have been pushed, it means that all the location data of the picture pointer data 230 and the audio pointer data 430 are already stored in the global pointer buffer 15. When the microcontroller 25 outputs the data switching signal 137 for instructing the transfer of the global pointer data 450, the interleaving circuit 34 transfers the global pointer data 450 received from the control data buffer 13 to the data recording circuit 35. The data recording circuit 35 writes the global pointer data 450 in an area subsequently to the last recorded audio pointer data 430.

(S1108) Through the recording operation described so far, i pieces of the picture pointer data 230 and i pieces of the audio pointer data 430 respectively located from the 2nd to the (i+1)th respective positions in the AV file are recorded on the recording medium. Each piece of the picture pointer data 230 and the audio pointer data 430 has the data structure including a plurality of the prepointers alone. Next, the microcontroller 25 searches and retrieves the global pointer data 450 so as to read out the ith picture pointer data 230(i) and the ith audio pointer data 430(i) in the picture pointer write buffer 27 and the audio pointer write buffer 29, respectively. Then, the microcontroller 25 reads out the (i+1)th picture pointer data 230(i+1) and the (i+1)th audio pointer data 430(i+1) in the picture pointer read buffer 16 and the audio pointer read buffer 28, respectively. Also, the microcontroller 25 transfers the prepointers stored in the picture pointer read buffer 16 and the audio pointer read buffer 28 to the picture pointer write buffer 27 and the audio pointer read buffer 29, respectively, as the respective postpointers. Through this procedure, the picture pointer data 230 and the audio pointer data 430 including both the prepointers and the postpointers are generated. Then, the microcontroller 25 controls updating the generated ith picture pointer data 230(i) and the ith audio pointer data 430(i) on the recording medium.

(S1109) The microcontroller 25 executes updating picture pointer data 230 and audio pointer data 430 from the ith to the 2nd pieces of them. In the end, the microcontroller 25 records the 1st picture pointer data 230 and the 1st audio pointer data 430 including the postpointers alone, and thus, the recording operation of the pointer data is completed.

(S1110) Next, the microcontroller 25 records at the top of the AV file, as the first global pointer data 450, a data having the same content as the second global pointer data 450 recorded at the end of the AV file 410 in the step S1107.

(S1111) Finally, the microcontroller 25 generates a file entry having a management data for the recorded AV file in the file control buffer. Then, the file control data 220 recorded in the file management area on the recording medium is updated.

Through the processing procedures as described above, one AV file 410 is recorded on the data recording medium. In the above description, after the pointer data including the prepointers alone is once recorded in the step S1105, the pointer data 230 and 430 are updated to include both the postpointers and the prepointers in the step S1108. In the recording operation for the AV file 410 through such processing procedures, the pointer data 230 and 430 are recorded simultaneously with the recording of the chapter data 440. Therefore, if any trouble occurs in the power supply during the recording of the AV file 410, all the pointer data 230 and 430 related to the chapter data 440 having recorded by the time of the occurrence of the trouble are already recorded on the recording medium as the prepointers 232 and 432. Accordingly, if an AV file 410 having incomplete pointer data is recorded on the medium, the recovery process can be performed easily while keeping the stored chapter data 440 as follows: The microcontroller 25 executes the data reproducing operation on all the sectors included in the recording area of this AV file 410, detects the address of a sector 201 where the data type code 207 indicating the control data is recorded in its sub-code field 204, and stores the address in the global pointer buffer 15 as the global pointer 251. Then, the microcontroller 25 further executes the procedures subsequent to the step S1107, thereby recording the picture pointer data 230 and the audio pointer data 430 including both the postpointers and the prepointers on the recording medium.

Figure 12:
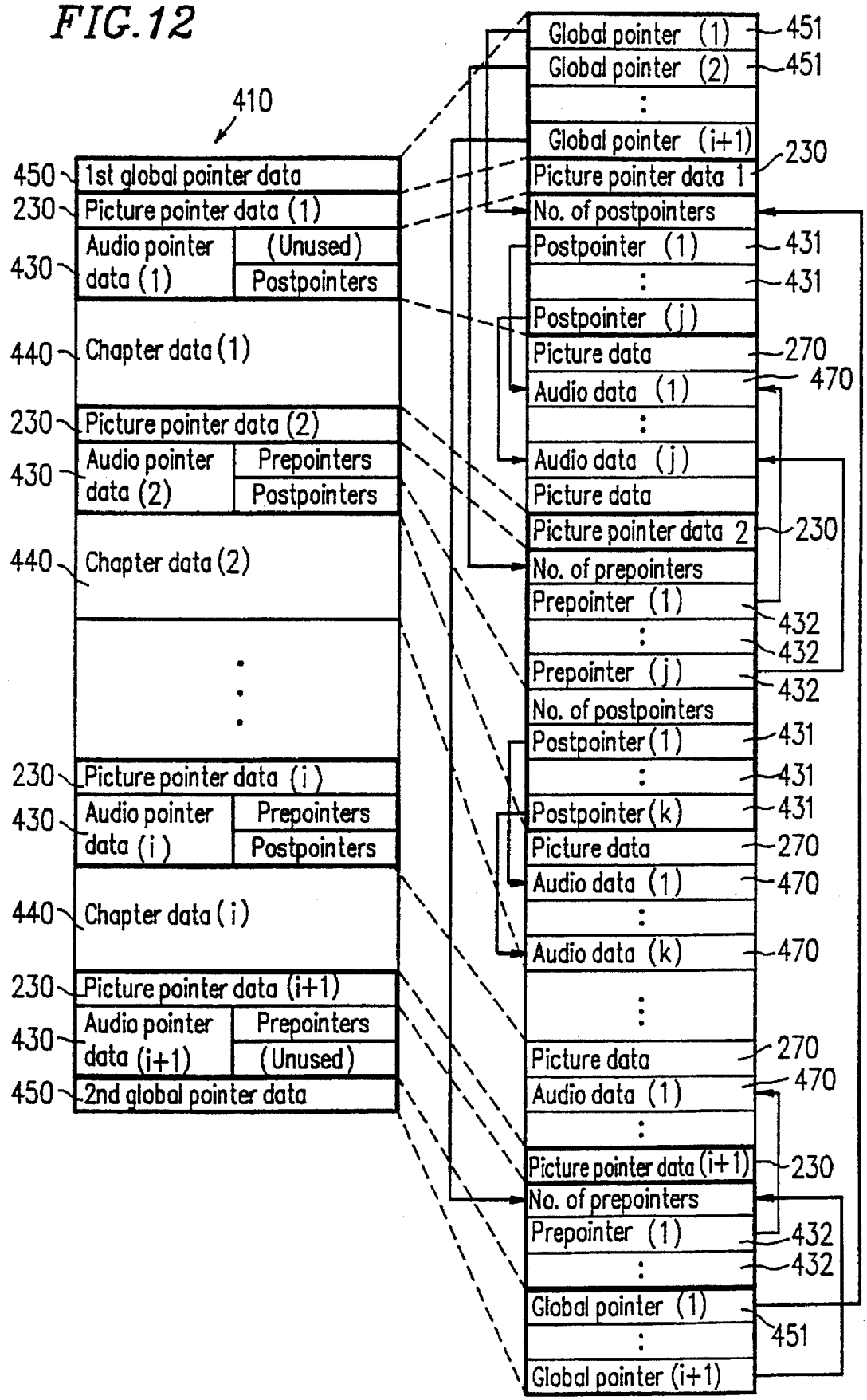
FIG. 12 shows the data structure of an AV file formed on a rewritable data recording medium.

FIG. 12 shows the data structure of the AV file 410 recorded on the recording medium in through the aforementioned operation. The data structure shown in FIG. 12 is different from that shown in FIG. 2 in that the audio pointer data 430 are always recorded subsequently to the picture pointer data 230. The order of the audio pointer data 430 and the picture pointer data 230 can be exchanged. The audio pointer data 430, which is read out during the postrecording operation, is located alternately with the chapter data 440. In FIG. 12, each global pointer 451 is shown as to directly indicate the location of the audio pointer data 430 for simplification of the description of the postrecording operation. Each global pointer 451, however, simultaneously indicates the location of the picture pointer data 230 similarly to the structure of FIG. 2. Specifically, each global pointer 451 is formed so as to have a pair of absolute addresses respectively indicating the locations of the picture pointer data 230 and the audio pointer data 430. The location of the audio pointer data 430 can be set as an offset representation from the picture pointer data 230. It is noted that the data structure shown in FIG. 12 is applied to a rewritable recording medium alone because it is used for attaining the postrecording function, but that the data structure shown in FIG. 2 is applicable to both the recording medium for the read-only and for the rewritable recording medium requiring no postrecording function.

When the location of the audio data 470 is managed by using the aforementioned hierarchical data structure, the capacity of the global pointer data 450 and the audio pointer data 430 are calculated as follows: It is assumed that the reproducing time for each chapter data is 1 minute in a movie title of 135 minutes. In this case, the global pointer data 450 includes 135 global pointers 451. When a stereo audio data signal is compressed into a data rate of 224 Kbps, the compressed audio data per 1 minute is 1,680 KB, and is recorded by using 840 sectors. Accordingly, when the audio data 470 is located by using the interleaved format shown in FIG. 3A, 840 prepointers 432 and 840 postpointers 431 are registered in each audio pointer data 430. When it is assumed that these pointers have the addresses of the respective sectors represented by four byte length, each of the prepointer 432 and the postpointer 431 has a capacity of 3,360 bytes, and is recorded by using two sectors.

When the audio data 470 is located by using the non-interleaved format as shown in FIG. 3B, the chapter data 440 includes 150 audio data 470, which is the same number as that of the GOP. Therefore, 150 prepointers 432 and 150 postpointers 431 are registered in each audio pointer data 430. When it is assumed that each pointer includes a combination of the start address (an absolute value representation of four byte length) and the last address (an offset representation of two byte length) of the audio data 470, the audio pointer data 430 has a capacity of 1,800 bytes, and is recorded by using one sector. The global pointer 451 indicating the location of the audio pointer data 430 has the sector address alone (four byte length representation), and hence, the capacity of the global pointer data 450 is 540 bytes. Accordingly, when each global pointer 451 is formed so as to have a pair of absolute addresses respectively indicating the locations of the picture pointer data 230 and the audio pointer data 430 as described above, the global pointer data 451 has a capacity of 1,080 bytes, and is recorded in one sector.

In order to retrieve the location of the audio data 430 in the postrecording operation, either of the prepointers 432 or the postpointers 431 of the audio pointer data 430 and the global pointer data 450 are required to be stored in the apparatus. Therefore, the memory capacity for storing these pointers read out from the recording medium is 6 KB in total (corresponding to three sectors) when the interleaved format is used and 4 KB (corresponding to two sectors) when the non-interleaved format is used. Thus, the buffer capacity, which is required to be 450 KB or 80 KB in the conventional apparatus as described above, can be greatly decreased.

The postrecording operation for the AV file 410 by the data recording/reproducing apparatus 400 of the present invention will now be described referring to a flowchart shown in FIG. 13. It is assumed, for simplification, that the AV file 410 includes three chapter data 440, and that each chapter data 440 includes four sectors 201 for storing the audio data 470. It is also assumed that the contents of the four audio pointer data 430 having the location data of the sectors 201 storing the audio data 470 are set as listed in Table 2.

TABLE 2

|  | Prepointers | Postpointers |
| --- | --- | --- |
| Audio Pointer Data 1 | (Unused) | Address (A1) |
|  | (Unused) | Address (A2) |
|  | (Unused) | Address (A3) |
|  | (Unused) | Address (A4) |
| Audio Pointer Data 2 | Address (A1) | Address (A5) |
|  | Address (A2) | Address (A6) |
|  | Address (A3) | Address (A7) |
|  | Address (A4) | Address (A8) |
| Audio Pointer Data 3 | Address (A5) | Address (A9) |
|  | Address (A6) | Address (A10) |
|  | Address (A7) | Address (A11) |
|  | Address (A8) | Address (A12) |
| Audio Pointer Data 4 | Address (A9) | (Unused) |
|  | Address (A10) | (Unused) |
|  | Address (A11) | (Unused) |
|  | Address (A12) | (Unused) |

Also, in the following description, it is assumed that the file control data 220 recorded on the recording medium has already been read out and stored in the file control data buffer 14 when the medium was loaded or reset.

(S1301) The operator selects an AV file 410 for executing the postrecording operation and determines the postrecording operation mode through the front panel 24, thereby actuating the data recording/reproducing apparatus 400. Such a recording condition is set in the microcontroller 25 as the operation mode control signal 110.

(S1302) The microcontroller 25 searches and retrieves the location of the specified AV file 410 from the file control data buffer 14 so as to read out the file control data. Then, the microcontroller 25 executes the reproducing operation of the first global pointer data 450 recorded at the top portion of the AV file 410. When the data reproducing operation is normally completed, the global pointer data 450 is stored in the global pointer buffer 15.

(S1303) When the detection of an uncorrectable error is informed by the data reproducing circuit 11 in step S1302, the microcontroller 25 executes, as the recovery process, the reproducing operation of the second global pointer data 450 recorded at the end portion of the AV file 410 in accordance with the processing procedure as used in the step S1302.

(S1304) The microcontroller 25 searches and retrieves the location of an audio pointer data 430(1) from the global pointer data 450 in order to execute the postrecording operation from the top of the AV file, and further executes the reproducing operation of the audio pointer data 430(1). When the data reproducing operation is normally completed, the audio pointer data 430(1) is stored in the audio pointer read buffer 28.

(S1305) The microcontroller 25 searches and retrieves the location of the audio data from the postpointers 431 of the reproduced audio pointer data 430(1) in the order of address A1, address A2, etc. (See Table 2).

(S1306) When the detection of an uncorrectable error is informed by the data reproducing circuit 11 in step S1304, the microcontroller 25 executes, as the recovery process, the reproducing operation of an audio pointer data 430(2) which is the subsequent audio pointer data, in accordance with the same processing procedure as used in the step S1304.

(S1307) The microcontroller 25 searches and retrieves the location of the audio data from the prepointers 432 of the audio pointer data 430(2).

(S1308) When the location of the audio data 470 is detected, the microcontroller 25 sets the retrieved address in the disk drive unit 10 as the drive control signal 113, and instructs the seek operation. Further, the microcontroller 25 also sets the address in the data recording circuit 35 as the recording operation control signal 138. Furthermore, the microcontroller 25 actuates the audio encoder circuit 33. The compressed audio data 133 generated by the audio encoder circuit 33 is stored in the audio data buffer 18 in units of a sector. When the interleaving circuit 34 outputs the compressed audio data 133 as the recording data 134, the data recording circuit 35 detects a sector having the set address, and writes the recording signal 136 which is obtained for the recording data 134 through the ECC process and the modulation process.

(S1309) The microcontroller 25 detects whether or not the stop key on the front panel 24 is pushed (i.e., a stop command is input), and terminates the postrecording operation if the key is pushed. Further, when the microcontroller 25 retrieves all the audio pointers to be searched, the microcontroller 25 detects that the AV file 410 is postrecorded to the end and terminates this operation.

(S1310) The microcontroller 25 searches and retrieves the prepointer 432 or the postpointer 431 corresponding to the subsequent audio data 430 from the audio pointer read buffer 28. When the subsequent audio pointer is detected, the microcontroller 25 executes the recording operation of the subsequent audio data 430 by returning to step S1308. When, for example, an address A4 is detected as the postpointer 431 in the step S1305, an address A5, that is, the subsequent postpointer, is not included in the audio pointer data 430(1) which has been stored in the audio pointer read buffer. In this case, the microcontroller 25 executes the reproducing operation of the subsequent audio pointer data 430(2) by returning to step S1304 (See Table 2).

(S1311) When the reproducing operations of the global pointer data 450 or the audio pointer data 430 are not normally completed in steps S1303 or the step S1306, respectively, the microcontroller 25 suspends the postrecording operation and displays a data reproducing error message.

As described above, in the data recording/reproducing apparatus 400 of the present invention, the global pointer data 450 and the audio pointer data 430 are previously read out in the memory circuits, the location of the audio data 470 is determined while retrieving the read data, and recording is performed while compressing externally input audio data. It is noted that when the error recovery process described in the steps S1303 and S1306 is not executed, the data recording/reproducing apparatus 400 can execute the postrecording operation by using a recording medium where the global pointer data and the audio pointer data are not multiply recorded.

In the audio compression method defined in the MPEG standard and the like, audio data is constant-bitrate-compressed. Therefore, when the audio data 470 is recorded in the step S1308, there is no fear of erroneously rewriting the video data (picture data 270) located immediately after or before the audio data 470. In step S1308, the audio encoder circuit 33 is designed to compress the externally input audio recording signal. However, when the audio data 470 recorded on the recording medium is uncompressed, the microcontroller 25 may determine an operation mode for uncompressed data, and the audio encoder circuit 33 can generate uncompressed audio data and record it on the recording medium. Therefore, the postrecording operation described above is applicable to both the compressed audio data and the uncompressed audio data.

According to the data recording medium of the present invention, the locations of the independent picture data which is arranged on the data recording medium at unequal intervals are managed by using the hierarchical management data including the picture pointer data for managing the location data of the independent picture data and the global pointer data for managing the location data of the picture pointer data. By using such a data recording medium, the data reproducing apparatus never requires a bulk memory to store all the location data of the independent picture data in the trickplay mode. It is possible to perform a rapid trickplay mode operation using memory circuits having only a small capacity by retrieving the locations of the independent picture data in a stepwise manner.

Further, according to the data reproducing apparatus and the data reproducing method of the present invention, the locations of the independent picture data located at unequal intervals are retrieved and reproduced by the hierarchical management data including the global pointer data and the picture pointer data. Therefore, in the data reproducing apparatus, since there is no need for a bulk memory for storing all the location data of the independent picture data in the trickplay mode operation, it is possible to perform a rapid trickplay mode operation by retrieving the locations of the independent picture data in a stepwise manner by using memory circuits with small capacity.

Moreover, the global pointer data is doubly recorded at the top portion and the end portion of each AV file, and the picture pointer data is also doubly recorded by using the postpointers and the prepointers. Accordingly, the efficiency of the trickplay mode can be increased, and the error recovery function can be largely enhanced without greatly increasing the data amount.

Further, according to the present invention, the locations of the audio data located on the data recording medium at unequal intervals are managed by using the hierarchical management data including the audio pointer data for managing the location data of the audio data and the global pointer data for managing the location data of the audio pointer data.

According to the data recording/reproducing apparatus and the data recording/reproducing method having the postrecording function of the present invention, the locations of the audio data located at unequal intervals are retrieved and reproduced by using the hierarchical management data including the global pointer data and the audio pointer data. As a result, there is no need for the bulk memory of the location data of the entire audio data in the postrecording operation. Therefore, the capacity of the used buffer can be largely decreased, resulting in realizing an inexpensive compact data recording/reproducing apparatus.

Furthermore, the global pointer data is doubly recorded at the top and end portions of each AV file, and the audio pointer data is also doubly recorded by using the postpointers and the prepointers. As a result, the efficiency of the postrecording operation can be increased, and the error recovery function can be largely enhanced without largely increasing the data amount.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data reproducing apparatus for reproducing each unit with a fixed length of data from a data recording medium for recording AV files each including the video data that is compressed in units of a picture on the variable-bitrate condition, each of the AV files including a plurality of chapter data including a plurality of GOP data, a plurality of first pointer data each having a plurality of first pointers, and at least one second pointer data each having a plurality of second pointers; each of the GOP data including one independent picture data that is intra-picture compressed and a plurality of dependent picture data that are inter-picture compressed; each of the first pointers being provided in a one-to-one correspondence to each of the independent picture data and storing location data of the corresponding independent picture data; each of the second pointers being provided in a one-to-one correspondence to each of the first pointer data and storing location data of the corresponding first pointer data, the data reproducing apparatus comprising:

pointer reproducing means for reading out the first and the second pointer data from the data recording medium;

first pointer data storing means for temporarily storing the read first pointer data;

second pointer data storing means for temporarily storing the read second pointer data;

control means for retrieving the location data of the first pointer data based on the second pointer data stored in the second pointer data storing means, and retrieving the location data of the independent picture data based on the retrieved location data of the first pointer data and the first pointer data stored in the first pointer data storing means; and picture reproducing means for reproducing a predetermined piece of the independent picture data from the data recording medium based on the retrieved location data of the independent picture data.

2. A data reproducing apparatus according to claim 1, wherein the control means comprises means for selecting the location data of the independent picture data to be retrieved in accordance with an externally determined reproducing speed.

3. A data reproducing apparatus according to claim 1, wherein, in the data recording medium, each of the GOP data further includes audio data being interleaved with the independent picture data and the dependent picture data of the basis of each unit with the fixed length, a data type code for discriminating the independent picture data being recorded on the basis of each unit with the fixed length, and the data reproducing apparatus further comprises data type discriminating means for discriminating the data type code recorded in the unit with the fixed length.

4. A data reproducing apparatus according to claim 1, wherein, in the data recording medium, a padding data is added to the independent picture data so that the independent picture data to which the padding data is added completes each unit with the fixed length, a valid data length for discriminating the padding data being recorded on the basis of each unit with the fixed length, and the data reproducing apparatus further comprises data length detection means for detecting the valid data length recorded in the unit with the fixed length.

5. A data reproducing method by using a data recording medium having a plurality of units with a fixed length for recording AV files each including the video data that is compressed in units of a picture on the variable-bitrate condition, each of the AV files including a plurality of chapter data including a plurality of GOP data, a plurality of first pointer data each having a plurality of first pointers, and at least one second pointer data each having a plurality of second pointers; each of the GOP data including one independent picture data that is intra-picture compressed and a plurality of dependent picture data that are inter-picture compressed; each of the first pointers being provided in a one-to-one correspondence to each of the independent picture data and storing location data of the corresponding independent picture data; each of the second pointers being provided in a one-to-one correspondence to each of the first pointer data and storing location data of the corresponding first pointer data, thereby selectively reproducing the independent picture data, the method comprising the steps of:

receiving an externally supplied reproducing condition;

reading out the second pointer data from the data recording medium;

temporarily storing the read second pointer data;

searching the stored second pointer data to retrieve the location data of the first pointer data satisfying the reproducing condition;

reading out the first pointer data from the data recording medium based on the retrieved location data of the first pointer data;

searching the stored first pointer data to retrieve the location data of the independent picture data satisfying the reproducing condition; and reproducing the independent picture data from the data recording medium based on the retrieved location data of the independent picture data.

6. A data reproducing method according to claim 5, wherein the reproducing condition includes a reproducing speed, and in the step of retrieving the location data of the independent picture data, the location data of the independent picture data to be retrieved is selected in accordance with the reproducing speed, thereby adjusting the interval between the independent picture data that is to be reproduced.

7. A data reproducing method according to claim 5, wherein, in the data recording medium, each of the GOP data further includes an audio data being interleaved with the independent picture data and the dependent picture data on the basis of each unit with the fixed length, a data type code for discriminating the independent picture data being recorded on the basis of each unit with the fixed length, and the step of retrieving the location data of the independent picture data includes the step of discriminating the data type code recorded in the unit with the fixed length, thereby selectively reproducing the independent picture data alone.

8. A data reproducing method according to claim 5, wherein, in the data recording medium, a padding data is added to the independent picture data so that the independent picture data to which the padding data is added completes each unit with the fixed length, a valid data length for discriminating the padding data being recorded on the basis of each unit with the fixed length, and the step of retrieving the location data of the independent picture data includes the step of detecting the valid data length recorded in the unit with the fixed length, thereby reproducing the independent picture data excluding the padding data.

9. A data reproducing method according to claim 5, wherein, in the data recording medium, the second pointer data is located at top and end portions of each of the AV files, the second pointer data including all the second pointers corresponding to the first pointer data included in the corresponding AV file, and the step of reading out the second pointer data comprises the steps of:

reading the second pointer data recorded at the top portion of the AV file, and when the second pointer data recorded at the top portion of the AV file is unreadable, reading the second pointer data recorded at the end portion of the AV file; and reading the second pointer data at the end portion of the AV file, and When the second pointer data recorded at the end portion of the AV file is unreadable, reading the second pointer data recorded at the top portion of the AV file.

10. A data reproducing method according to claim 5, wherein, in the data recording medium, the chapter data and the first pointer data are alternately located, and each of the first pointer data includes the first pointers corresponding to the independent picture data included in the chapter data adjacent to that particular first pointer data, the first pointers include both prepointers storing the location data of the independent picture data included in one of the chapter data located immediately before the corresponding first pointer data and post-pointers storing the location data of the independent picture data included in one of the chapter data located immediately after the corresponding first pointer data, and the step of reading out the first pointer data comprises the steps of:

reading the postpointers included in the nth first pointer data, and when the postpointers included in the nth first pointer data are unreadable, reading the prepointers included in the (n+1)th first pointer data; and reading the prepointers included in the nth first pointer data, and when the prepointers included in the nth first pointer data are unreadable, reading the postpointers included in the (n−1)th first pointer data.

* * * * *